(12) United States Patent
Takenaka et al.

(10) Patent No.: US 11,423,496 B2
(45) Date of Patent: Aug. 23, 2022

(54) INFORMATION PROCESSING DEVICE, INFORMATION PROCESSING METHOD, AND PROGRAM

(71) Applicant: SONY CORPORATION, Tokyo (JP)

(72) Inventors: Shigeto Takenaka, Tokyo (JP); Masanori Morishita, Tokyo (JP); Kazuo Nishiyama, Tokyo (JP); Yoshiyuki Nakamura, Kanagawa (JP); Hitomi Hoshi, Tokyo (JP); Satsuki Eguchi, Tokyo (JP); Hiroshi Takeda, Chiba (JP)

(73) Assignee: SONY CORPORATION, Tokyo (JP)

( * ) Notice: Subject to any disclaimer, the term of this patent is extended or adjusted under 35 U.S.C. 154(b) by 920 days.

(21) Appl. No.: 15/323,527

(22) PCT Filed: Apr. 3, 2015

(86) PCT No.: PCT/JP2015/060608
§ 371 (c)(1),
(2) Date: Jan. 3, 2017

(87) PCT Pub. No.: WO2016/009682
PCT Pub. Date: Jan. 21, 2016

(65) Prior Publication Data
US 2017/0161852 A1 Jun. 8, 2017

(30) Foreign Application Priority Data
Jul. 15, 2014 (JP) .............................. JP2014-144885

(51) Int. Cl.
*G06Q 50/16* (2012.01)
*G06Q 30/02* (2012.01)
(Continued)

(52) U.S. Cl.
CPC ............. *G06Q 50/16* (2013.01); *G06N 7/005* (2013.01); *G06Q 30/02* (2013.01); *G06Q 30/06* (2013.01); *G06Q 50/10* (2013.01); *G06N 20/00* (2019.01)

(58) Field of Classification Search
CPC ...................................................... G06Q 50/16
See application file for complete search history.

(56) References Cited

U.S. PATENT DOCUMENTS

2008/0133319 A1* 6/2008 Adiga ................... G06Q 30/00
705/313
2015/0012303 A1* 1/2015 Ghosh ................... G06Q 50/16
705/4

(Continued)

FOREIGN PATENT DOCUMENTS

JP 2002-133260 A 5/2002
JP 2003-22314 A 1/2003
(Continued)

OTHER PUBLICATIONS

International Search Report dated May 19, 2015 in PCT/JP2015/060608 (with English language translation).
(Continued)

*Primary Examiner* — Maria C Santos-Diaz
(74) *Attorney, Agent, or Firm* — Xsensus LLP

(57) ABSTRACT

To provide information useful to a variety of users engaged in real estate transactions. Provided is an information processing device including a graph rendering unit that renders a graph expressing an anticipated transaction price of a second real estate property, based on actual transaction prices and required transaction times of a first real estate property already bought or sold, and a display control unit that causes the graph to be displayed on a client device, wherein the graph includes an element expressing a probability distribution of the anticipated transaction price, and
(Continued)

an element expressing an anticipated required transaction time corresponding to the anticipated transaction price.

19 Claims, 13 Drawing Sheets

(51) Int. Cl.
G06Q 50/10 (2012.01)
G06Q 30/06 (2012.01)
G06N 7/00 (2006.01)
G06N 20/00 (2019.01)

(56) References Cited

U.S. PATENT DOCUMENTS

2015/0193470 A1* 7/2015 Romaya ............ G06Q 50/16 705/313
2015/0193797 A1* 7/2015 Gerrity ............. G06Q 30/0206 705/7.35
2015/0242747 A1* 8/2015 Packes ............... G06N 3/0454 706/17
2019/0005516 A1* 1/2019 Spath ............... G06Q 30/0201

FOREIGN PATENT DOCUMENTS

JP 2004-199126 A 7/2004
JP 2007-164751 A 6/2007

OTHER PUBLICATIONS

Kano Shigeki, "Tokeiteki Kasetsu Kentei to Kaiki Bunseki" Keizai Seminar, vol. 9, No. 668, Oct.-Nov. 2012, pp. 53-59.

* cited by examiner

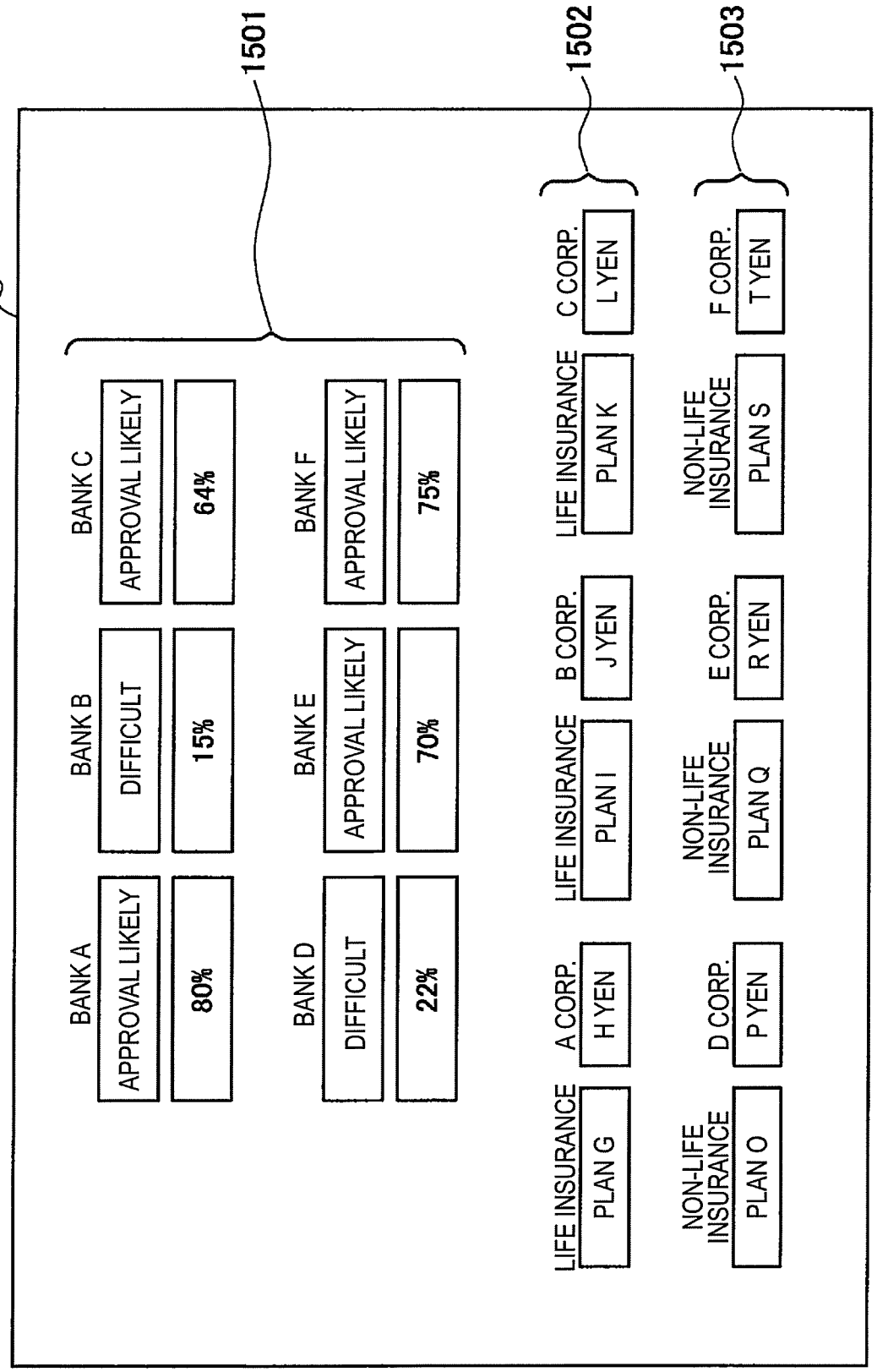

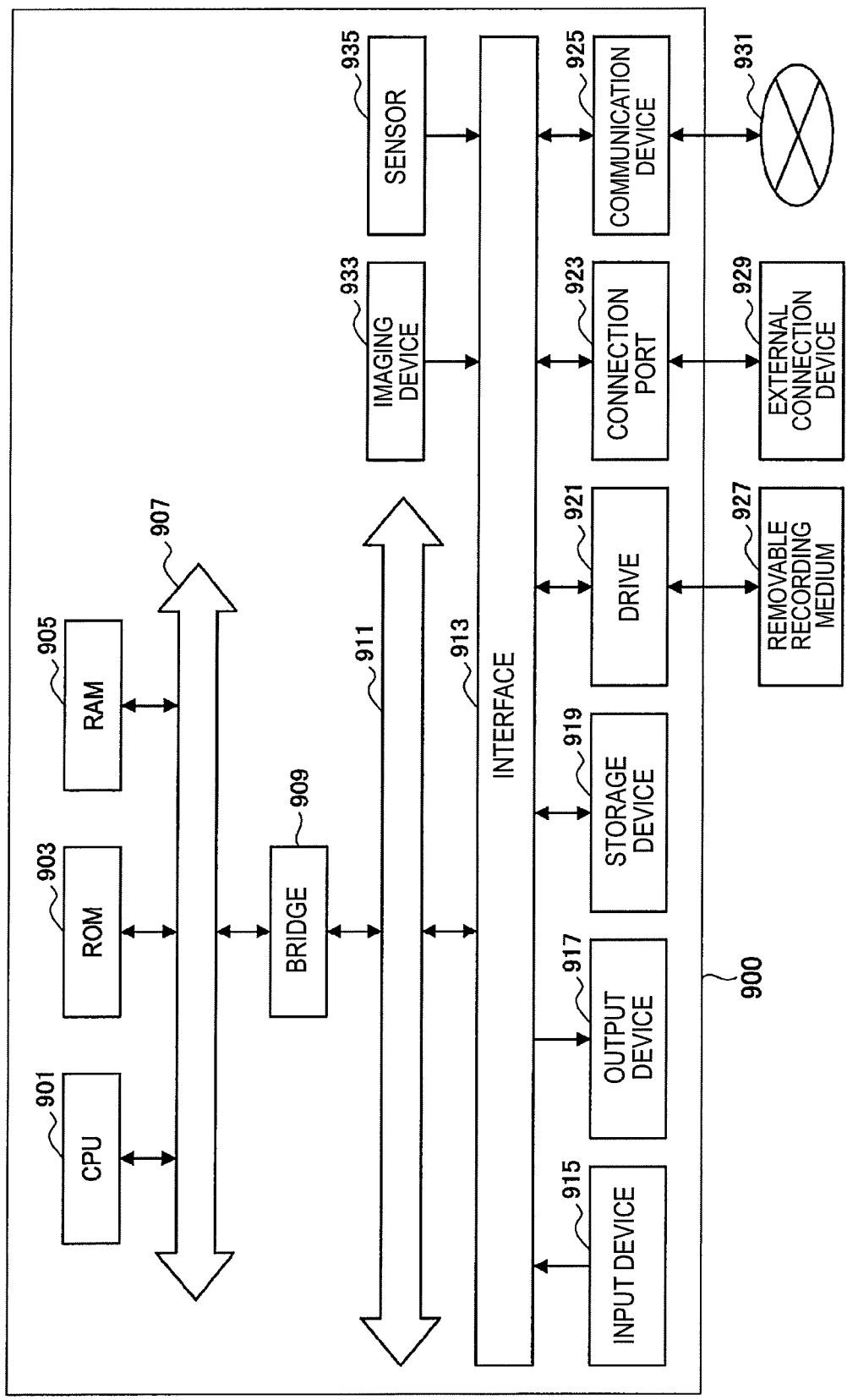

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

Recently, even in real estate transactions, actions such as information searches and correspondence related to transactions often are being performed over a network such as the Internet. For example, Patent Literature 1 describes a technology that acquires user information and real estate information saved on a server, based on a user identifier and a real estate identifier input into a client, and creates an inspection invitation on which the acquired user information and real estate information are filled in.

CITATION LIST

Patent Literature

Patent Literature 1: JP 2003-281252A

SUMMARY OF INVENTION

Technical Problem

However, technology like that described in Patent Literature 1, for example, is usable only when a user who primarily is attempting to purchase or rent real estate searches for or inspects real estate. On the other hand, for example, for a variety of users engaged in real estate transactions (which may include not only users attempting to purchase or rent real estate, but may also include users attempting to sell or rent out real estate), technology capable of providing useful information for such users has not been proposed adequately as of yet.

Accordingly, the present disclosure proposes a new and improved information processing device, information processing method, and program capable of providing information useful to a variety of users engaged in real estate transactions.

Solution to Problem

According to the present disclosure, there is provided an information processing device, including: a graph rendering unit that renders a graph expressing an anticipated transaction price of a second real estate property, based on actual transaction prices and required transaction times of a first real estate property already bought or sold; and a display control unit that causes the graph to be displayed on a client device. The graph includes an element expressing a probability distribution of the anticipated transaction price, and an element expressing an anticipated required transaction time corresponding to the anticipated transaction price.

Further, according to the present disclosure, there is provided an information processing method, including: rendering, by a processor, a graph expressing an anticipated transaction price of a second real estate property, based on actual transaction prices and required transaction times of a first real estate property already bought or sold; and causing, by a processor, the graph to be displayed on a client device. The graph includes an element expressing a probability distribution of the anticipated transaction price, and an element expressing an anticipated required transaction time corresponding to the anticipated transaction price.

Further, according to the present disclosure, there is provided a program causing a computer to realize: a function of rendering a graph expressing an anticipated transaction price of a second real estate property, based on actual transaction prices and required transaction times of a first real estate property already bought or sold; and a function of causing the graph to be displayed on a client device. The graph includes an element expressing a probability distribution of the anticipated transaction price, and an element expressing an anticipated required transaction time corresponding to the anticipated transaction price.

Advantageous Effects of Invention

According to the present disclosure as described above, it is possible to provide information useful to a variety of users engaged in real estate transactions.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is a diagram illustrating an example of a results display screen for package simulation of related services, provided in an embodiment of the present disclosure.

FIG. 13 is a block diagram illustrating an example hardware configuration of an information processing device according to an embodiment of the present disclosure.

DESCRIPTION OF EMBODIMENT(S)

Figure 1:
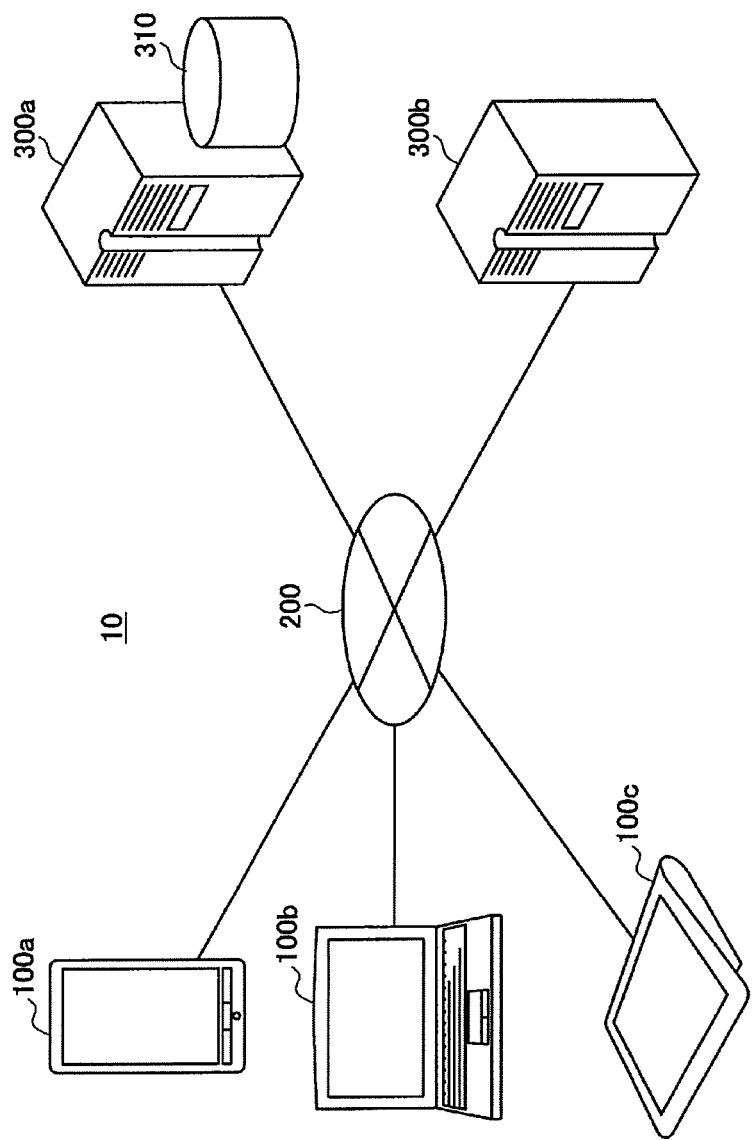
FIG. 1 is a diagram illustrating a diagrammatic configuration of a system according to an embodiment of the present disclosure.

Hereinafter, (a) preferred embodiments) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.
1. System configuration
2. Real-time dialogue between user and agent
2-1. Functional configuration
2-2. Example of user interface
3. Providing information related to appropriate price
3-1. Functional configuration
3-2. Example of user interface
3-3. Example of appraisal value formula
4. Package simulation of related services
4-1. Functional configuration
4-2. Example of user interface
5. Hardware configuration
6. Supplemental remarks (1. System Configuration)

FIG. 1 is a diagram illustrating a diagrammatic configuration of a system according to an embodiment of the present disclosure. Referring to FIG. 1, a system 10 according to the present embodiment includes a client 100 and a server 300. The client 100 and the server 300 are connected by a network 200, and are able to communicate with each other.

The client 100 may include devices such as a smartphone 100*a*, a personal computer 100*b*, and a tablet 100*c*, for example. The client 100 is not limited to the illustrated example, and may include any type of terminal device having a function of inputting and outputting information with respect to a user. To output information to a user, the client 100 uses images, sound, and the like, for example. Additionally, the client 100 accepts the input of information from the user through operating input on the terminal device, sound indicating speech, an image indicating a gesture or line of sight, or the like.

The server 300 includes one or multiple server devices on a network. Although two server devices 300*a* and 300*b* are shown in the illustrated example, there may also be a single server device, or three server devices or more. Respective server devices may also work cooperatively to realize the functions of the server 300 described hereinafter. In this case, the entirety of the multiple server devices may be treated as a single information processing device. Alternatively, at least one or some of the server devices may be run by an operator different from the operator of the server 300 described hereinafter. In such a case, in the following description, part of the server 300 may be referred to as an external server not included in the system 10.

In the present embodiment, at least one or some of the server devices include a database 310. In the database 310, information related to real estate and users is stored. Also, at least one or some of the server devices may also include a function of inputting and outputting information with respect to an agent of real estate transactions. Such a function may be utilized to execute real-time exchange of images or sound between the user and the agent, for example.

The network 200 includes any of various types of wired or wireless networks, such as the Internet, a local area network (LAN), or a mobile phone network, for example. The network 200 connects the client 100 and the server 300, and may also connect multiple server devices included in the server 300. In cases in which multiple types of networks are included in the network 200, the network 200 may also include devices such as routers and hubs that interconnect such networks.

Figure 2:
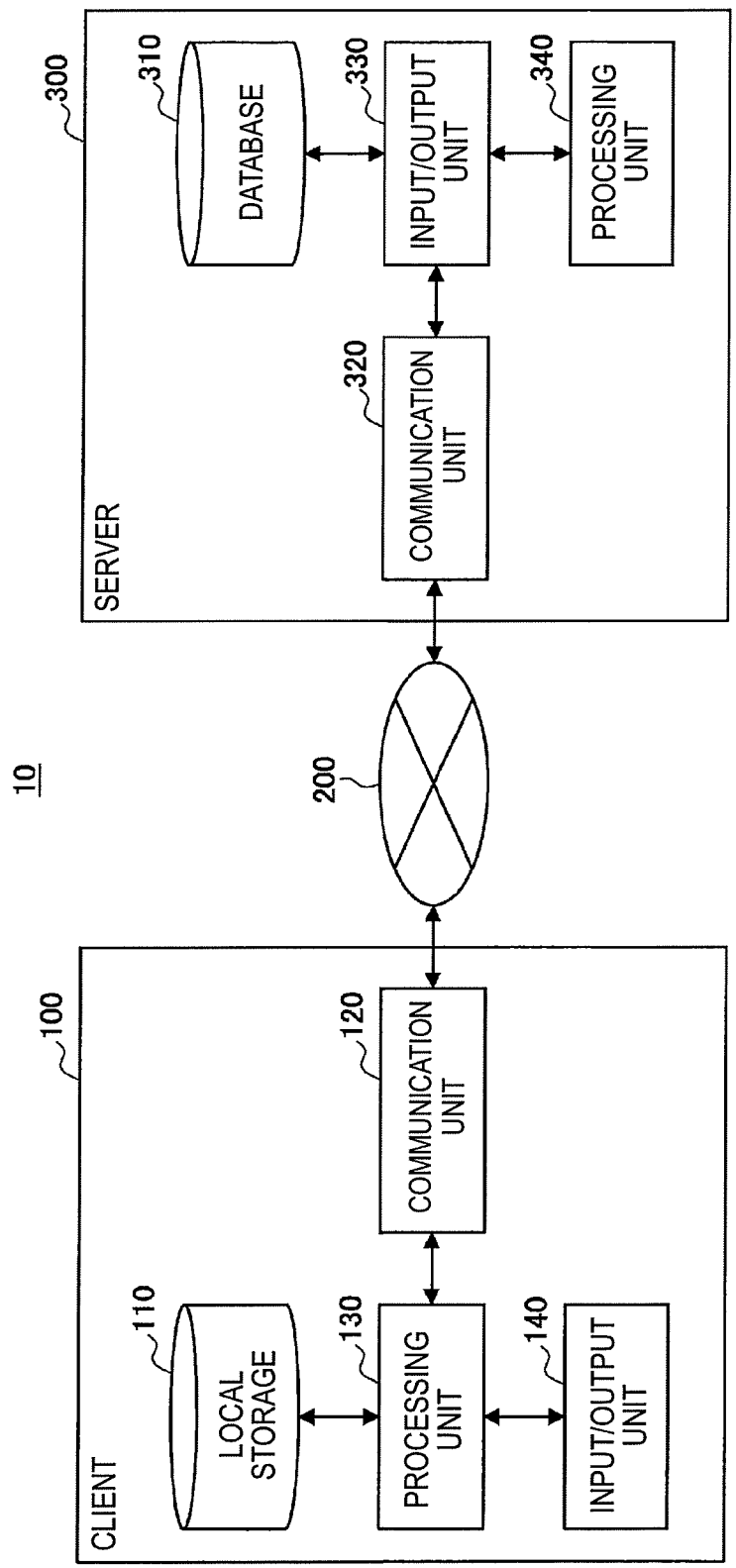
FIG. 2 is a block diagram illustrating an internal configuration of a system according to an embodiment of the present disclosure.

FIG. 2 is a block diagram illustrating an internal configuration of a system according to an embodiment of the present disclosure. Referring to FIG. 2, the client 100 may include local storage 110, a communication unit 120, a processing unit 130, and an input/output unit 140. The server 300 may include the database 310, a communication unit 320, a processing unit 330, and an input/output unit 340. Hereinafter, each of the functional elements will be described further. Note that the terminal device that functions as the client 100, and the one or multiple server devices included in the server 300, are realized by the hardware configuration of the information processing device discussed later, for example.

(Client Configuration)

The local storage 110 is realized by memory or storage included in the terminal device, for example. In the local storage 110, information provided by the server 300 over the network 200 and information input by the user through the input/output unit 140 is stored temporarily or persistently, for example. The user utilizes the information stored in the local storage 110 to reference information provided by the server 300 even while offline, or to input a draft of information to provide to the server 300.

The communication unit 120 communicates with the server 300 over the network 200. The communication unit 120 is realized by a communication device that executes communication on a network to which the client 100 is connected.

The processing unit 130 is realized by a processor such as a central processing unit (CPU) included in the terminal device, for example. For example, the processing unit 130 executes a process of requesting information from the server 300 through the communication unit 120, based on information input by the user through the input/output unit 140. As another example, the processing unit 130 executes a process of outputting information to the user through the input/output unit 140, based on information provided by the server 300 through the communication unit 120. At this point, the processing unit 130 may also execute a process of converting provided information into a suitable format according to the type of the input/output unit 140.

The input/output unit 140 is realized by an input device, such as a touch panel, mouse, keyboard, microphone, or camera (imaging device), and an output device, such as a display or speaker, included in the terminal device, for example. Note that the input/output unit 140 may also include only one of either an input device or an output device. For example, information received from the server 300 through the communication unit 120 is processed by the processing unit 130 and displayed on a display included in the input/output unit 140. As another example, user operating input acquired by a touch panel or the like included in the input/output unit 140 is processed by the processing unit 130 and transmitted to the server 300 through the communication unit 120.

Since the functions themselves of the processing unit 130 and the input/output unit 140 as above are similar to the functions of a processing unit and an input/output unit in a typical terminal device, for example, a detailed explanation thereof may be reduced or omitted in the following description of the present embodiment. However, even in such cases, if the information received from the server 300 is characteristic, for example, the functions of the processing unit 130 or the input/output unit 140 in the client 100 with respect to processing and outputting such information may also be characteristic compared to these functions in a typical terminal device.

(Server Configuration)

The database 310 is realized by memory or storage included in the server device, for example. As described earlier, in the database 310, information related to real estate and users is stored. Note that more specific types of information stored in the database 310 may differ depending on the content of the service provided by the server 300.

The communication unit 320 communicates with the client 100 over the network 200. Additionally, the communication unit 320 may also communicate with an external server over the network 200. The communication unit 320 is realized by a communication device that executes communication on a network to which the server 300 is connected.

The processing unit 330 is realized by a processor such as a CPU included in the server device, for example. For example, the processing unit 330 executes a process of acquiring information from the database 310 based on information received from the client 100 through the communication unit 320, and after processing the acquired information as necessary, transmitting to the client 100 through the communication unit 320. As another example, the processing unit 330 may also execute a process of outputting information received from the client 100 through the communication unit 320 to the agent through the input/output unit 340, and also transmitting information input by the agent through the input/output unit 340 to the client 100 through the communication unit 320.

The input/output unit 340 is realized by an input device, such as a touch panel, mouse, keyboard, microphone, or camera (imaging device), and an output device, such as a display or speaker, included in the server device or a terminal device connected to the server device, for example. For example, information received from the client 100 through the communication unit 320 is processed by the processing unit 330 and displayed on a display included in the input/output unit 340. As another example, agent operating input acquired by a touch panel or the like included in the input/output unit 340 is processed by the processing unit 330 and transmitted to the client 100 through the communication unit 320. Note that in the case in which the server 300 generates information automatically based on information received from the client 100, the input/output unit 340 does not necessarily need to be included in the server 300.

Note that if the server 300 includes multiple server devices, the functional configuration of the server 300 discussed above may be realized distributed among the multiple server devices. For example, the functions of the database 310 may be realized by being concentrated in one of the server devices, or may be realized by centrally operating and managing a database distributed among multiple server devices. As another example, the functions of the processing unit 330 may also be realized by centrally operating and managing a processor distributed among multiple server devices. In this case, the functions of the processing unit 330 described hereinafter may be realized by being distributed serially or in parallel among multiple server devices, regardless of the demarcations of the function blocks defined for the sake of explanation.

(2. Real-Time Dialogue Between User and Agent)

(2-1. Functional Configuration)

In the system 10 according to the present embodiment, real-time dialogue may be realized between a user on the side of the client 100 and an agent on the side of the server 300. The dialogue may be one utilizing picture and sound, or one utilizing one of either picture or sound, for example. In the following, a detailed configuration of the server 300 for realizing such a function will be described further.

Figure 3:
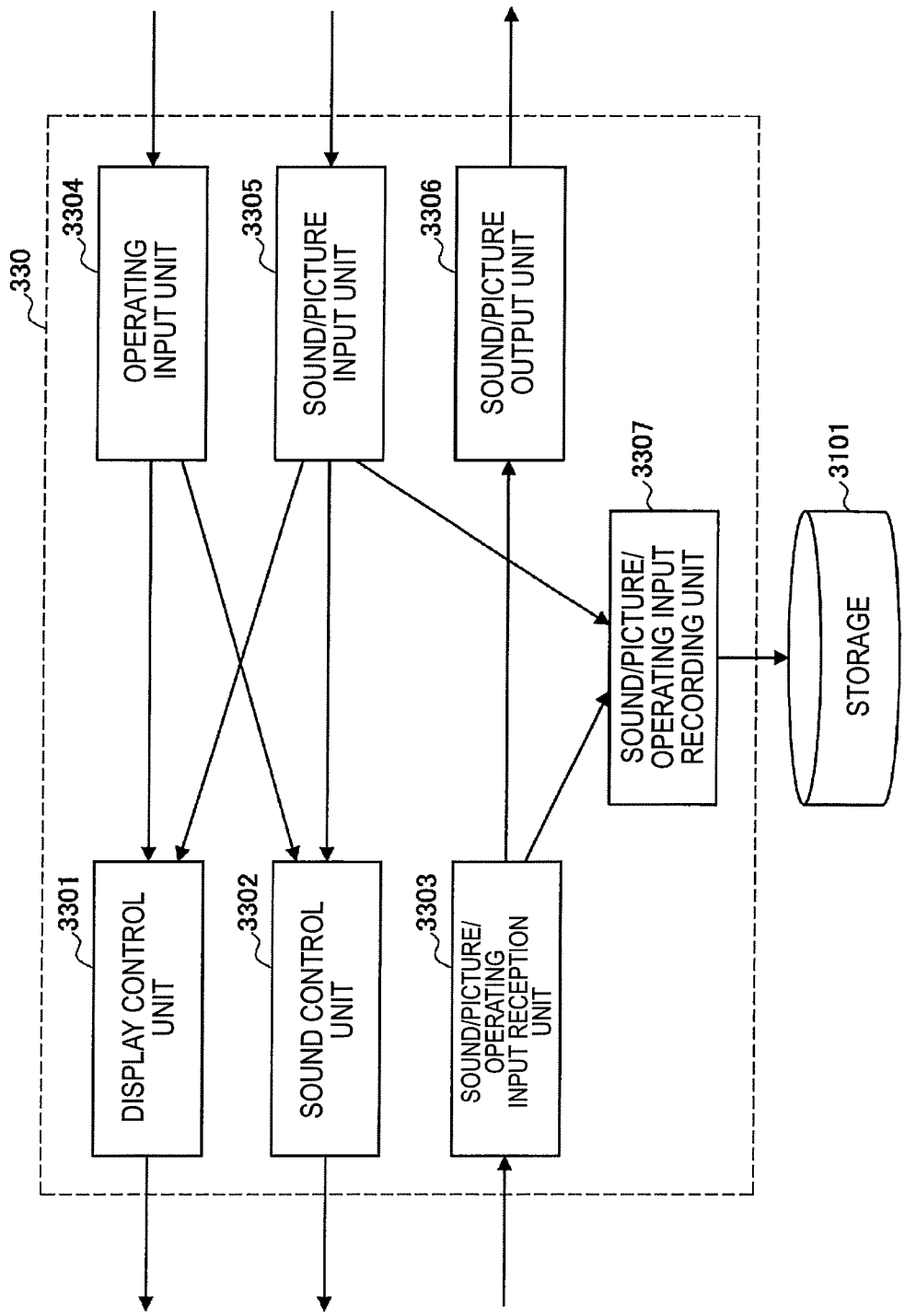
FIG. 3 is a block diagram illustrating an example functional configuration for realizing real-time dialogue between a user and an agent in an embodiment of the present disclosure.

FIG. 3 is a block diagram illustrating an example functional configuration for realizing real-time dialogue between a user and an agent in an embodiment of the present disclosure. Referring to FIG. 3, in this example, the processing unit 330 of the server 300 includes a display control unit 3301, a sound control unit 3302, a sound/picture/operating input reception unit 3303, an operating input unit 3304, a sound/picture input unit 3305, a sound/picture output unit 3306, and a sound/picture/operating input recording unit 3307. Also, the database 310 includes storage 3101 for recording sound, a picture, or operating input.

The display control unit 3301 controls a display device such as a display included in the input/output unit 140 of the client 100, through the communication unit 320 and the network 200. More specifically, the display control unit 3301 generates data for displaying an image on the client 100 (such as HTML or other document data, or encoded image data, for example), based on agent operating input acquired by the operating input unit 3304 or a picture acquired by the sound/picture input unit 3305, and transmits the generated data to the client 100 through the communication unit 320. In the client 100, the processing unit 130 receiving data through the communication unit 120 generates a control signal for causing a display or the like to display the above image.

The sound control unit 3302 controls a sound output device such as a speaker included in the input/output unit 140 of the client 100, through the communication unit 320 and the network 200. More specifically, the sound control unit 3302 generates data for outputting sound on the client 100 (such as encoded sound data, for example), based on agent operating input acquired by the operating input unit 3304 or sound acquired by the sound/picture input unit 3305, and transmits the generated data to the client 100 through the communication unit 320. In the client 100, the processing unit 130 receiving data through the communication unit 120 generates a control signal for causing a speaker or the like to output the above sound.

The sound/picture/operating input reception unit 3303 receives sound, picture or operating input data acquired by the input/output unit 140 of the client 100, through the network 200 and the communication unit 320. For example, sound is acquired by a microphone or the like included in the input/output unit 140, a picture is acquired by a camera or the like included in the input/output unit 140, and operating input is acquired by a touch panel, a mouse, a keyboard, or the like included in the input/output unit 140. The sound/picture/operating input reception unit 3303 provides the received data to the sound/picture output unit 3306, and also to the sound/picture/operating input recording unit 3307 for recording as necessary.

The operating input unit 3304 acquires agent operating input accepted by a touch panel, a mouse, a keyboard, or the like included in the input/output unit 340 of the server 300. By the agent operating input, what kind of information to include in an image to be displayed on the client 100 may be selected, for example. As discussed later, the image to be displayed may include materials such as text and images related to a real estate property or the agent him- or herself, for example. By the operating input, the agent is able to select what kinds of materials to present to the user. Additionally, as discussed later, the image to be displayed on the client 100 may also include input elements enabling the user to express his or her intent. By the operating input, the agent is also able to select what kinds of input elements to present at which timings.

The sound/picture input unit 3305 acquires sound or a picture captured by a microphone, a camera, or the like included in the input/output unit 340. The sound includes speech spoken by the agent, for example. The picture may include the figure of the agent, a property presented by the agent, the agent's credentials or official certification, a model of a building, or the like. The sound/picture input unit 3305 provides the acquired sound to the sound control unit 3302, and the picture to the display control unit 3301.

The sound/picture output unit 3306 controls the sound and picture output by a display and speaker or the like included in the input/output unit 340, based on information received by the sound/picture/operating input reception unit 3303. For example, the sound/picture output unit 3306 may decode encoded sound data received by the sound/picture/operating input reception unit 3303, and generate a control signal for outputting sound from a speaker. As another example, the sound/picture output unit 3306 may generate image data based on picture data and operating input data received by the sound/picture/operating input reception unit 3303, and generate a control signal for causing a display to display an image based on the generated data.

The sound/picture/operating input recording unit 3307 records sound, a picture, or operating input in the storage 3101, based on information received by the sound/picture/operating input reception unit 3303. The sound and the picture may be utilized as a recording of the figures and speech spoken by the user and the agent during the real-time dialogue, for example. Only one of either sound or picture may also be recorded. If the image displayed on the client 100 includes an input element enabling the user to express his or her intent, the operating input may be utilized as a recording of the user's expression of intent made using that input element.

(2-2. Example of User Interface)

Figure 4:
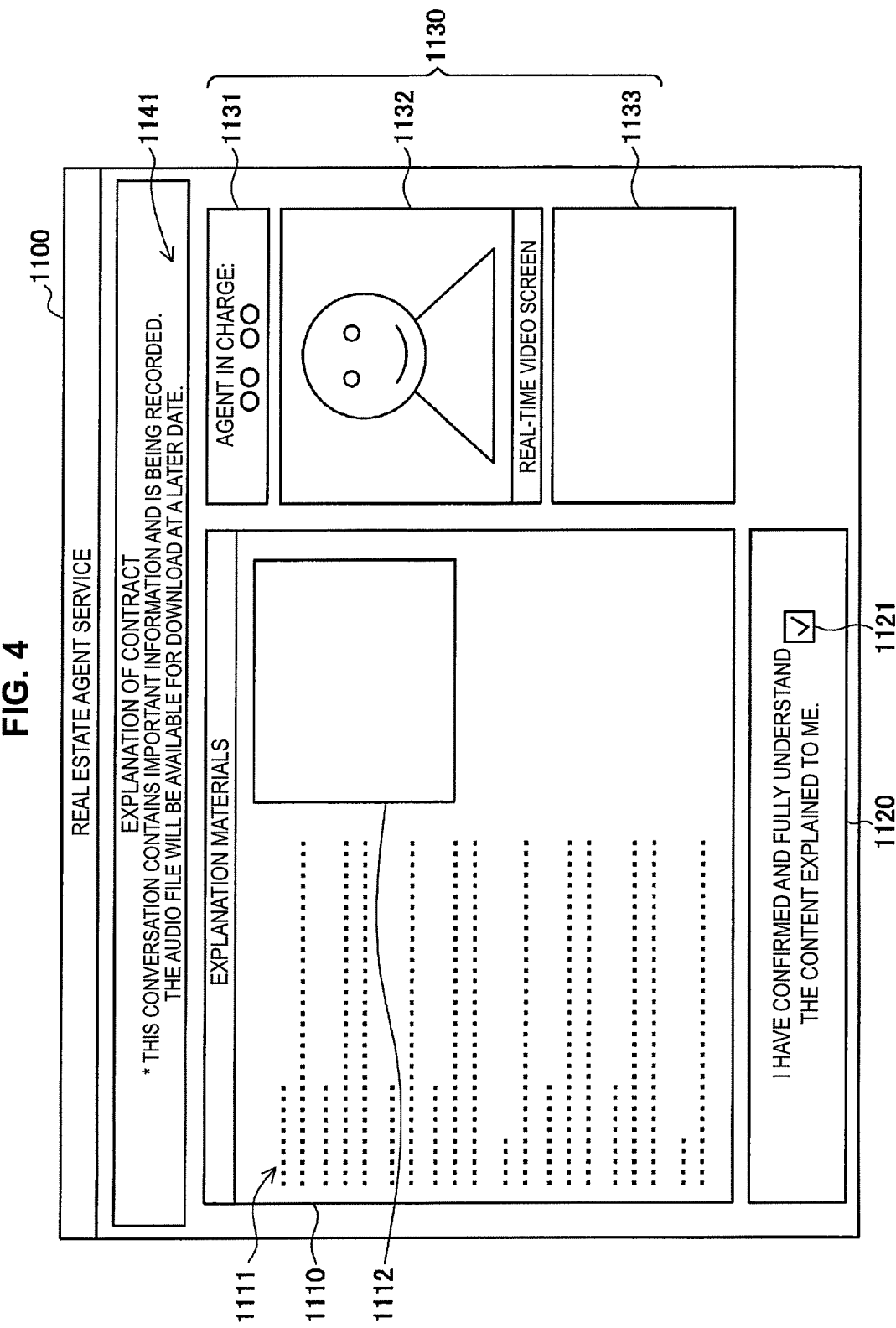
FIG. 4 is a diagram illustrating an example of a user interface for real-time dialogue between a user and an agent, provided in an embodiment of the present disclosure.

FIG. 4 is a diagram illustrating an example of a user interface for real-time dialogue between a user and an agent, provided in an embodiment of the present disclosure. Referring to FIG. 4, a screen 1100 displayed on the client 100 includes a materials window 1110, an input window 1120, and agent information 1130.

The screen 1100 is displayed when the agent explains to the user about a real estate transaction or a rental contract, for example. In the materials window 1110, materials for explaining contract details or the like are displayed. The materials may include text 1111, a chart 1112, and the like, for example. The chart 1112 illustrates features such as the plot or floor plan of the real estate under the contract, for example. In the input window 1120, an input element 1121 and its description enabling the user receiving the explanation to express his or her intent are displayed. In the illustrated example, the input element 1121 is a check box. The user is able to check the check box of the input element 1121 by using a touch panel, mouse, keyboard, or the like including the input/output unit 140 of the client 100, for example. Such user operating input may be acquired as an expression of intent signifying that the user has confirmed and understood the content of the explanation. The agent information 1130 includes an agent name 1131, an agent image 1132, and a certification image 1133.

Typically, for a real estate transaction or a rental contract, the user receives an explanation face-to-face with an agent or the like, and signs a document as an expression of intent signifying that the user has confirmed and understood the content of the explanation. The screen 1100 may substitute for such a procedure. In other words, the materials displayed in the materials window 1110 substitute for printed materials presented during a face-to-face explanation. Furthermore, in the agent image 1132, a real-time image of the agent captured by a camera included in the input/output unit 340 of the server 300 is displayed, while similarly, on the agent side, a real-time image of the user captured by a camera included in the input/output unit 140 of the client 100 is also displayed, and if the speech of both is exchanged, an environment similar to the case of conducting a face-to-face explanation may be provided.

Furthermore, by having the sound/picture/operating input recording unit 3307 record the speech exchanged during the series of explanations and a user operation on the input element 1121, it is possible to leave a record signifying that the user has confirmed and understood the content of the explanation, similarly to a signature. Since the exchange, such as the actual speech, is recorded, it may be considered possible to leave a record more reflecting the actual situation than a face-to-face explanation. Recorded speech and the like may also be referenced after the fact by the user him- or herself, and this fact may be displayed by a notice 1141. In addition, with the certification image 1133 included in the agent information 1130, it is also possible to present information such as the agent's official certification which is required in a face-to-face explanation like the above (for example, the presentation of the certification for the national qualification of "Real Estate Transaction Specialist" under current Japanese law as of July 2014).

Note that to realize the real-time dialogue between the user and the agent described above, established technology related to what is commonly called video chat, for example, may be utilized in addition to the configuration described above. Additionally, to ensure the confidentiality and safety of the exchange, such as the sameness of the information transmitted by the client 100 and the information recorded by the server 300, for example, established security technology may also be utilized. Since such established technology is already well-known and suitably usable by persons skilled in the art, a detailed description is omitted from this specification.

In the present embodiment, by making it possible to realize a real-time dialogue between the user and the agent as above, even if the user and the agent are in remote locations from each other, for example, the user may still be given a sufficient explanation of the contract or the like, and furthermore, it is possible to leave a record signifying that the user has confirmed and understood the content of the explanation. Consequently, for a real estate transaction or rental, the user inconvenience of needing to travel to receive an explanation from an agent or the like is resolved, making it easier for users living in remote locations or foreign countries to engage in real estate transactions and rental agreements, for example.

Note that the real-time dialogue between the user and the agent like the above example is not limited to the case of explaining a real estate transaction or rental contract, and may also be used in cases such as explaining a real estate property during the examination stage. In this case, by providing an environment similar to a face-to-face explanation even though not actually face-to-face, the user's reassurance and convenience may be improved. Additionally, the real-time dialogue between the user and the agent like the above example is not limited to real estate deals, and is also applicable to any in case in which there exists a user who makes a request of some kind, and an agent who accepts the request, for example.

(3. Providing Information Related to Appropriate Price)
(3-1. Functional Configuration)

In the system 10 according to the present embodiment, by having the server 300 process information stored in the database 310 or the like, information related to an appropriate price of a real estate property may be provided. In the following, a detailed configuration of the server 300 for realizing such a function will be described further.

Figure 5:
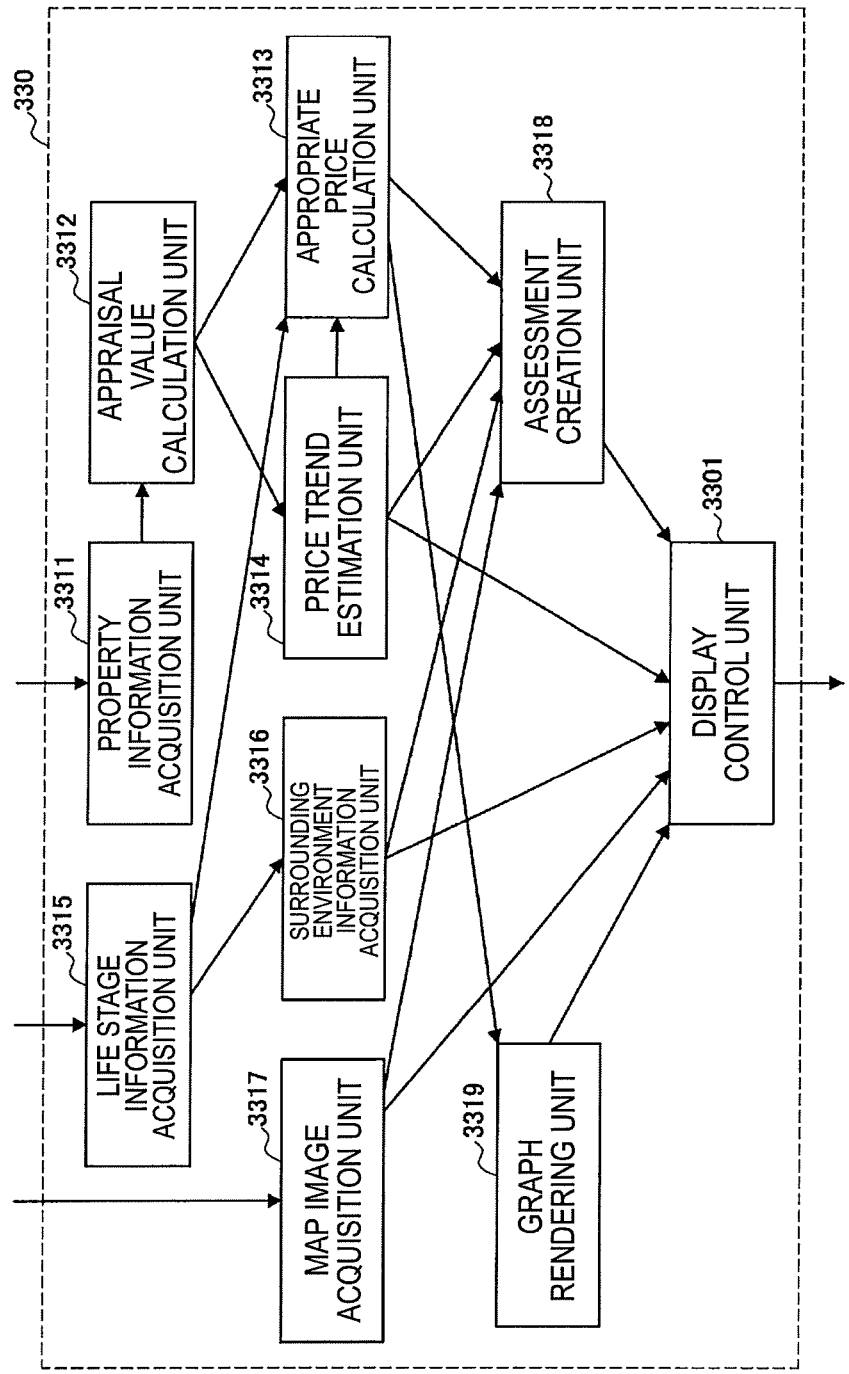
FIG. 5 is a block diagram illustrating an example functional configuration for providing information related to an appropriate price of a real estate property in an embodiment of the present disclosure.

FIG. 5 is a block diagram illustrating an example functional configuration for providing information related to an appropriate price of a real estate property in an embodiment of the present disclosure. Referring to FIG. 5, in this example, the processing unit 330 of the server 300 includes a property information acquisition unit 3311, an appraisal value calculation unit 3312, an appropriate price calculation unit 3313, a price trend estimation unit 3314, a life stage information acquisition unit 3315, a surrounding environment information acquisition unit 3316, a map image acquisition unit 3317, an assessment creation unit 3318, a graph rendering unit 3319, and a display control unit 3301.

In this example, according to a functional configuration like the above, a screen including a graph about a real estate property or an assessment of the real estate property is output. In the illustrated example, the output of both a screen including a graph and an assessment is possible, but in another example, only one of either a screen including a graph or an assessment may also be output. Additionally, the information items included on the screen including a graph and the assessment are not limited to the example described hereinafter, and may be various. Consequently, for example, a screen or an assessment not including some of the items described hereinafter may also be output. In this case, the processing unit 330 may also not include the functional configuration corresponding to the omitted items. Also, a screen or an assessment including items other than the items described hereinafter may also be output. In this case, the processing unit 330 additionally includes a functional configuration for generating the information of such items.

The property information acquisition unit 3311 acquires information about a real estate property for which information is to be provided, as well as information about other real estate properties required to provide such information. Real estate property information may be stored in the database 310 of the server 300, or may be acquired by utilizing a service provided by an external server over a network, for example. Additionally, real estate property information may include information such as the location and square measure of the property, traffic access conditions, the shape of the land or building, the floor plan, the age of the building, and the builder, as well as information about the price or rent when the property was sold or rented in the past.

The appraisal value calculation unit 3312 calculates appraisal values of real estate properties, based on the real estate property information acquired by the property information acquisition unit 3311. More specifically, the appraisal value calculation unit 3312 calculates appraisal values of real estate properties by using a function that includes appraisal factors of the real estate property as variables, such as the location and square measure of the property, traffic access conditions, the shape of the land or building, the floor plan, the age of the building, and the builder. As discussed later, the function used herein may be different depending on the location of the real estate property whose appraisal value is to be calculated. Herein, the appraisal value calculation unit 3312 may also calculate an appraisal value of a single real estate property. The appraisal value itself of a real estate property is useful information for property transaction or rental. Additionally, the appraisal value calculation unit 3312 may also calculate appraisal values of real estate properties including first real estate properties that already have been bought or sold, and a second real estate property that is going to be bought or sold. In this case, for example, the appropriate price calculation unit 3313 discussed later is able to calculate an appropriate price of the second real estate property, based on the relationship between the appraisal value and the actual transaction price of the first real estate properties, and the appraisal value of the second real estate property. Note that the appraisal value calculation unit 3312 may calculate the appraisal values by using a function shared in common between the first real estate properties and the second real estate property, or calculate the appraisal values by using different functions.

Note that in the above function, the appraisal factors themselves may also be treated as variables. For example, for appraisal factors in which the appraisal can be expressed as a numerical value, such as the square measure of a property (a more extensive square measure is appraised more highly), the age of the building (a newer building is appraised more highly), and traffic access conditions (a shorter time required to reach the nearest station or central business district (CBD) is appraised more highly), the appraisal factors themselves may be treated as variables in the function. In this case, if the relationship between the appraisal factor and the appraisal is linear, the appraisal factor may be treated as a first-order variable, whereas if non-linear, the appraisal factor may be treated as a second- or higher-order variable.

In addition, in the above function, a score given to a class of an appraisal factor may be treated as a variable. For example, factors such as the location of a property, the shape of the land or building, the floor plan, and the builder are not quantified by themselves, but may be given a score depending on popularity, high appraisal, or the like. More specifically, high scores are given to districts indicated to be popular according to surveys, floor plans that are mostly evaluated as easy to use, builders with few complaints after construction, and the like. Such scores are treated as first-order, second-order, or higher-order variables, similarly to the numerical appraisal factors above.

The appropriate price calculation unit 3313 calculates an appropriate price of the real estate property, based on the appraisal value calculated by the appraisal value calculation unit 3312. For example, in the case of buying or selling a real estate property, the appropriate price means a price that is appropriate from the perspective of the seller or the buyer. For example, the appropriate price to the seller is a price at which the likelihood of finding a buyer during a tolerable amount of time is estimated to be sufficiently high. On the other hand, the appropriate price to the buyer is a price at which the likelihood of finding a seller within a tolerable amount of time is estimated to be sufficiently high. The appropriate price may be calculated for a real estate property that a seller is attempting to sell (hereinafter also called a property for sale), or for a real estate property that a buyer is attempting to buy (hereinafter also called a desired property for purchase). Both a property for sale and a desired property for purchase correspond to the "second real estate property" in the description of the appraisal value calculation unit 3312 earlier.

Note that for a property for sale, a specific property is already specified, but for a desired property for purchase, although there may be desired terms, typically a specific property is not specified. Consequently, in the case of calculating an appropriate price for a desired property for purchase, for example, the appraisal value calculation unit 3312 may calculate an appraisal value for a virtual property having appraisal factors matching the desired terms, and the appropriate price calculation unit 3313 may calculate an appropriate price for the virtual property.

Herein, the appropriate price calculated by the appropriate price calculation unit 3313 does not necessarily match the appraisal value calculated by the appraisal value calculation unit 3312. This is because whereas the appraisal value is calculated uniquely using a function that takes appraisal factors as variables, the appropriate price may be different depending on the amount of time tolerable by the seller or the buyer, for example. Consequently, for example, for real estate properties that have already been bought or sold near the location of the property for sale or the desired property for purchase (corresponding to the "first real estate properties" in the description of the appraisal value calculation unit 3312 earlier), the appropriate price calculation unit 3313 analyzes the relationship of the appraisal value, the actual transaction price, and the required transaction time, and based on this relationship, generates a model indicating the relationship of the appraisal value and the appropriate price for each of anticipated required transaction times of the property for sale or the desired property for purchase. The appropriate price calculation unit 3313 is able to calculate an appropriate price for a property by applying, to the above model, an anticipated required transaction time and an appraisal value of the property for sale or the desired property for purchase which are input by the user of the client 100, for example.

For example, in the case of a property for sale, the above model may indicate a lower appropriate price as the anticipated required transaction time becomes shorter (because the likelihood of selling quickly rises if the price is low), and a higher appropriate price as the anticipated required transaction time becomes longer (because the likelihood of selling high rises if one waits patiently). Conversely, in the case of a desired property for purchase, the above model may indicate a higher appropriate price as the anticipated required transaction time becomes shorter (because the likelihood of being able to buy quickly rises if the budget is high), and a lower appropriate price as the anticipated required transaction time becomes longer (because the likelihood of being able to buy cheaply rises if one waits patiently). Herein, in each of these cases, the degree to which the appropriate price varies with respect to the anticipated required transaction time may be different depending on the location of the property, for example, and thus a model is generated based on information about real estate properties that have already been bought or sold near the location of the property for sale or the desired property for purchase. For similar reasons, the appropriate price calculation unit 3313 may also generate a model based on information about real estate properties which have already been bought or sold and which have attributes similar to the property for sale or the desired property for purchase.

The price trend estimation unit 3314 estimates the price trend of real estate properties near the location of a target real estate property. More specifically, the price trend estimation unit 3314 estimates the price trend as a tendency of change over time occurring in the relationship of the appraisal value, the actual transaction price, and the required transaction time for real estate properties that have already been bought or sold near the location of the property for sale or the desired property for purchase (corresponding to the "first real estate properties" in the description of the appraisal value calculation unit 3312 earlier).

As described earlier, the appropriate price calculation unit 3313 generates a model indicating the relationship between the appraisal value and the appropriate price for each of anticipated transaction times of the second real estate property, based on the relationship of the appraisal value, the actual transaction price, and the required transaction time of the first real estate properties. However, swings are likely to occur in the actual transaction price of the first property according to changes in the price trend produced by various factors, such as changes in the economy and urban structure, and the establishment or demolishment of various facilities. More specifically, for example, if the time period of the transaction is different, there may exist a real estate property with a different relationship between the appraisal value and the actual transaction price, even though the required transaction time is the same. In such cases, the price trend estimation unit 3314 models the tendency of swings (changes over time) in the transaction price as a price trend. For example, if the actual transaction price becomes higher with respect to the appraisal value as the time period of the transaction becomes closer to the present, it is estimated that the price of real estate properties in that region is tending to rise.

A price trend like the above is estimated by the price trend estimation unit 3314, and may be presented to the user directly as information, or utilized as an input element of the appropriate price calculation unit 3313 discussed earlier, for example. For example, the appropriate price calculation unit 3313 may calculate the appropriate price of the second real estate property, based on the price trend estimated for real estate properties already bought or sold (the first real estate properties) positioned near the location of the property for sale or the desired property for purchase (the second real estate property), and the appraisal value of the second real estate. More specifically, the appropriate price calculation unit 3313 may correct the appropriate price upward or downward, depending on the price trend.

The life stage information acquisition unit 3315 acquires life stage information about the user of the client 100. For example, the life stage information acquisition unit 3315 acquires life stage information, such as the user's age, gender, occupation, and existence of a spouse, children, or other family members, according to user operating input acquired using a touch panel, mouse, keyboard, or the like included in the input/output unit 140 of the client 100. Note that to input such information, the user interface displayed on a display of the client 100, for example, may utilize an already well-known configuration, and for this reason a detailed description is omitted.

In the present embodiment, the information acquired by the life stage information acquisition unit 3315 is utilized by units such as the appropriate price calculation unit 3313 and the surrounding environment information acquisition unit 3316. For example, based on the life stage information, the appropriate price calculation unit 3313 may calculate an appropriate price (anticipated sale price) of a property at a point in time when the user attempting to purchase a real estate property is predicted to sell the property in the future, or in other words, at a specific future point in time, and present the anticipated sale price together with the current appropriate price for purchase to the user. The appropriate price of the property in the future may be calculated by adding to the age of the building used by the appraisal value calculation unit 3312 to calculate the appraisal value, and inferring the price trend in the future from the past price trend estimated by the price trend estimation unit 3314. Note that the utilization of the life stage information by the surrounding environment information acquisition unit 3316 will be described in the following section.

The surrounding environment information acquisition unit 3316 acquires surrounding environment information near the location of a real estate property. The surrounding environment information may be stored in the database 310 of the server 300, or may be acquired by utilizing a service provided by an external server over a network, for example. Surrounding environment information includes information about commercial facilities, means of transportation, educational establishments, nursing facilities, and the like near a property. For example, in the present embodiment, the surrounding environment information acquisition unit 3316 acquires surrounding environment information reflecting life events having a high probability of occurring for the user in the future, based on the life stage information acquired by the life stage information acquisition unit 3315. More specifically, the surrounding environment information acquisition unit 3316 may selectively acquire information about nearby schools according to the ages of the user's children, information about elderly nursing facilities according to the ages of the user's family members, and the like.

The map image acquisition unit 3317 acquires a map image near the location of a real estate property. The map image may be stored in the database 310 of the server 300, or may be acquired by utilizing a service provided by an external server over a network, for example. Herein, the map image may include a map based on positioning, or a map deformed with reference to various facilities, landmarks, and the like. An icon indicating the location of the real estate property may be added to the map image, for example. Furthermore, icons indicating the positions of other nearby real estate properties, including properties utilized in the above processes of appropriate price calculation and price trend estimation, may be added to the map image. Additionally, icons indicating surrounding environment information acquired by the surrounding environment information acquisition unit 3316, such as the positions of various facilities, for example, may also be added to the map image.

The assessment creation unit 3318 creates an assessment of a real estate property, including the appropriate price calculated by the appropriate price calculation unit 3313, for example. The assessment is used by the agent during the buying or selling of the real estate property to provide information such as a summary of the property, the appropriate price at the present time, and anticipated fees, for example. The assessment may be created in any of various types of document formats, such as Portable Document Format (PDF), for example, based on information provided by the appropriate price calculation unit 3313, the price trend estimation unit 3314, the surrounding environment information acquisition unit 3316, and/or the map image acquisition unit 3317. Since the assessment may include content that varies over time (such as the appropriate price), content calculated or appraised by the agent's own techniques, and the like, the assessment creation unit 3318 may also set a term of validity on viewing of the document file of the assessment. Furthermore, the document file of the assessment may also be configured to be deleted automatically when the term of validity expires. Herein, a specific example of an assessment will be discussed later.

The graph rendering unit 3319 renders a graph expressing the anticipated transaction price of a real estate property. More specifically, the graph rendering unit 3319 renders a graph expressing the anticipated transaction price of the second real estate property, based on the actual transaction price and required transaction time of the first real estate properties already bought or sold. The graph may include an element expressing a probability distribution of anticipated transaction prices, and an element expressing anticipated required transaction times corresponding to the anticipated transaction prices. Herein, the probability distribution of anticipated transaction prices is generated by applying a distribution of the ratio of the actual transaction price versus the appraisal value of the first real estate properties to the appraisal value of the second real estate property.

In this case, for example, the graph rendering unit 3319 may also render a graph by utilizing intermediate-stage data from the process, performed by the appropriate price calculation unit 3313, of generating a model indicating the relationship between the appraisal value and the appropriate price for each of anticipated required transaction times of the second real estate property. In other words, in the above example, the appropriate price calculation unit 3313 models a distribution of the ratio of the actual transaction price versus the appraisal value of the first real estate properties, using the required transaction time as a parameter. On the other hand, the graph rendering unit 3319 directly utilizes the distribution of the ratio of the actual transaction versus the appraisal value of the first real estate properties. The anticipated transaction price of the second real estate property is calculated for the case of applying the appraisal value of the second real estate property to the above ratio (the case of simply multiplying the appraisal value of the second real estate property by the ratio), and for the case in which the second real estate property is bought or sold "under the same terms" as each property included among the first real estate properties.

Consequently, the above probability distribution of the anticipated transaction price generated by the graph rendering unit 3319 goes higher in the portion of the transaction price corresponding to the ratio (between the actual transaction price and the appraisal value) where more of the first real estate properties lie. Since there are not estimated to be many first real estate properties that were bought or sold at a transaction price extremely higher or lower than the appraisal value, the probability distribution of the anticipated transaction price should converge on a distribution centered on an average anticipated transaction price. One purpose of the graph rendered by the graph rendering unit 3319 is to express this convergence. This point will be described further hereinafter.

As above, in the present embodiment, the appropriate price calculation unit 3313 generates a model indicating the relationship between the appraisal value and the appropriate price for each of anticipated required transaction times of the second real estate property that is going to be bought or sold, based on the relationship of the appraisal value, the actual transaction price, and the actual required transaction time of first real estate properties that already have been bought or sold. Furthermore, the appropriate price calculation unit 3313 calculates the appropriate price of the second property by applying the appraisal value and the anticipated required transaction time of the second real estate property to the generated model.

At this point, if instead of the appropriate price, an arbitrary desired price is input into the above model, the anticipated required time for buying or selling a property at the desired price is calculated. However, if the desired price for selling is too high, or if the desired price for buying is too low, for example, the likelihood of establishing a transaction is low, no matter how much time is taken. On the other hand, if the desired price for selling is too low, or the desired price for buying is too high, a transaction may be established immediately, but in some cases a transaction may still be established immediately without lowering the sale price or raising the purchase price that much (in other words, it may not be necessary to set such an extreme desired price right from the start). Since almost no cases like the above are considered to be included among the first real estate properties already bought or sold, the model generated by the appropriate price calculation unit 3313 does not necessarily reflect cases like the above appropriately.

Accordingly, in the present embodiment, by having the graph rendering unit 3319 render a graph including a probability distribution of the anticipated transaction price, and presenting that graph to the user, it is possible to inform the user of the extent of the range in appropriate prices based on the examples of first real estate properties that already have been bought or sold. Additionally, the graph rendering unit 3319 is also able to display on the graph an anticipated transaction time corresponding to each anticipated transaction price, based on the model generated by the appropriate price calculation unit 3313. Note that a specific example of such a graph will be discussed later.

As already described, the display control unit 3301 controls a display device such as a display included in the input/output unit 140 of the client 100, through the communication unit 320 and the network 200. More specifically, in the illustrated example, the display control unit 3301 generates data for displaying an image on the client 100 (such as HTML or other document data, or encoded image data, for example), based on data provided by the price trend estimation unit 3314, the surrounding environment information acquisition unit 3316, the map image acquisition unit 3317, the assessment creation unit 3318, and/or the graph rendering unit 3319, and transmits the generated data to the client 100 through the communication unit 320. In the client 100, the processing unit 130 receiving data through the communication unit 120 generates a control signal for causing a display or the like to display the above image.

(3-2. Example of User Interface)
(Example of Screen Including Graph)

Figure 6:
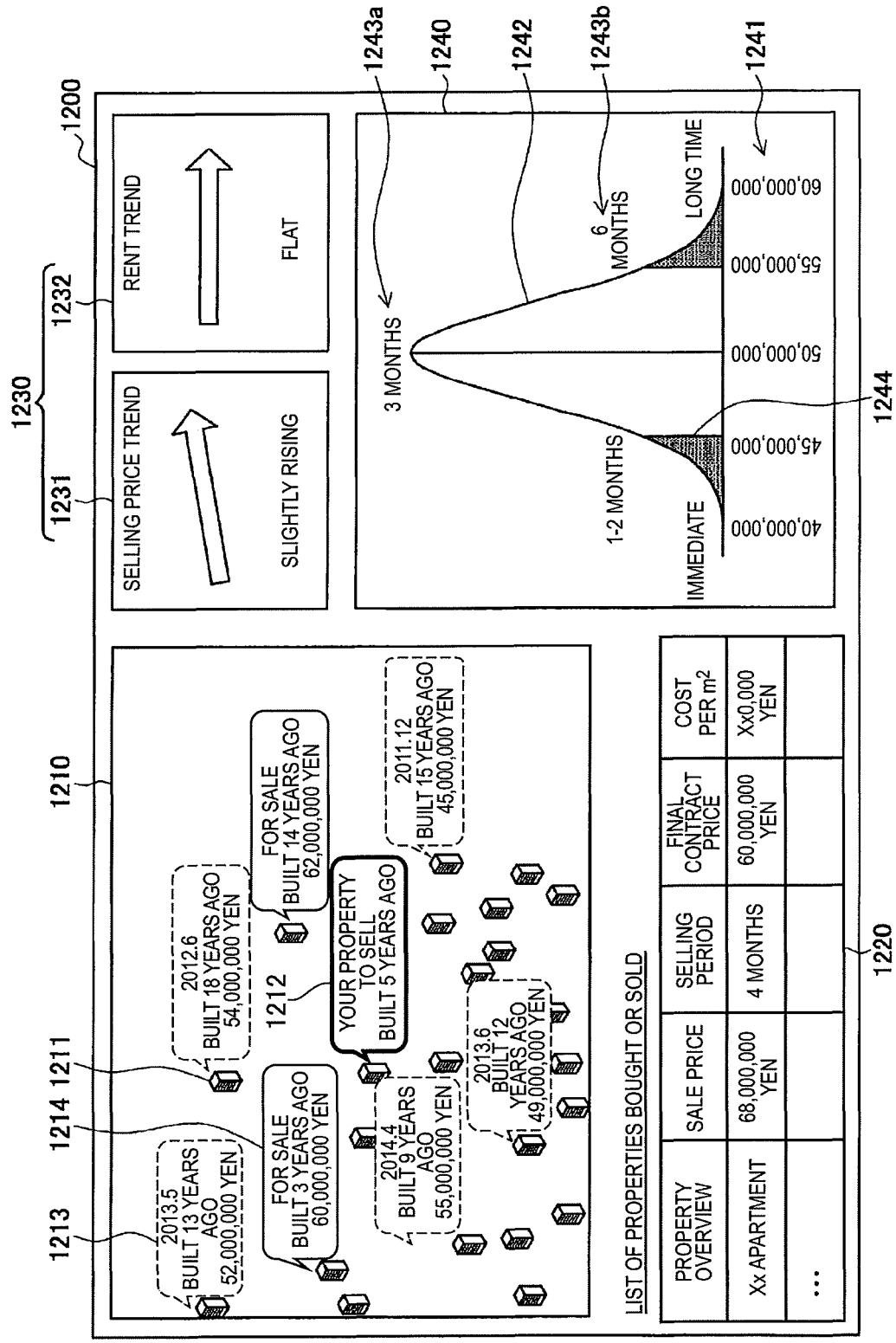
FIG. 6 is a diagram illustrating an example of a screen including a graph provided in an embodiment of the present disclosure.

FIG. 6 is a diagram illustrating an example of a screen including a graph provided in an embodiment of the present disclosure. Referring to FIG. 6, the screen 1200 displayed on the client 100 includes a map window 1210, a bought/sold property list 1220, a price trend display 1230, and a graph window 1240.

The screen 1200 is displayed when the user references information for buying or selling a property on the client 100, for example. At the stage when the screen 1200 is displayed, the user is inputting information about a property for sale, or inputting desired purchase terms. Consequently, at the stage when the screen 1200 is displayed, a property for sale is specified, or a virtual property having appraisal factors matching the desired terms of purchase is specified.

The map window 1210 displays a map image near a target real estate property to provide information about, based on the information acquired by the map image acquisition unit 3317 described earlier. In the illustrated example, in the map window 1210, property icons 1211 and popups 1212 to 1214 are displayed on the map. The property icons 1211 display a property for sale or a desired property for purchase, as well as other real estate properties nearby. In the illustrated example, these property icons 1211 are displayed in the same way, but may also be displayed with different shapes and sizes depending on the type of property. The popup 1212 displays information about the target property to provide information about. In the illustrated example, the age of a property for sale is displayed. The popup 1213 displays information about a property bought or sold in the past near the location of the target property. In the illustrated example, the date when the transaction was established, the age of the property at the time of the transaction, and the transaction price are displayed. The popup 1214 displays information about another property currently for sale near the location of the target property to provide information about. In the illustrated example, the age of the property and the sale price are displayed.

The bought/sold property list 1220 displays information about properties bought or sold in the past near the location of the target property to provide information about. The information displayed in the bought/sold property list 1220 may overlap partially with the information displayed by the popup 1213 above, but may also include information not in the popup 1213. In the illustrated example, the bought/sold property list 1220 includes information about the property name, the initial desired sale price, the required time, the transaction price, and the cost per unit area.

The price trend display 1230 includes a transaction price trend display 1231 and a rent trend display 1232. As above, in the present embodiment, the price trend of real estate properties in the region is estimated by the price trend estimation unit 3314. The transaction price trend display 1231 expresses the estimated price trend with the direction of an arrow icon and text. Also, although not illustrated in FIG. 5, in the processing unit 330 of the server 300, it is also possible to estimate the trend of rent for renting real estate properties, according to a process similar to the transaction price. The rent trend display 1232 expresses the trend of rent estimated in this way with the direction of an arrow icon and text.

In the graph window 1240, a graph rendered by the graph rendering unit 3319 is displayed. More specifically, in the graph window 1240, an anticipated transaction price 1241, a distribution curve 1242, anticipated required time labels 1243, and a statistical interval 1244 are displayed. In the illustrated example, the anticipated transaction price 1241 is displayed as the horizontal axis of the graph. The distribution curve 1242 expresses the probability distribution with respect to each anticipated transaction price 1241 on the vertical axis. The anticipated required time labels 1243 are displayed as labels on the distribution curve 1242, and display the anticipated required transaction time for each anticipated transaction price. The statistical interval 1244 displays a confidence interval or the like of the probability distribution indicated by the distribution curve 1242. Hereinafter, each of these elements will be described in further detail.

The distribution curve 1242 indicates a distribution of the probability of a reasonable transaction being established for the target real estate property at the price indicated as the anticipated transaction price 1241. Herein, a reasonable transaction means a transaction that does not take an unlimited amount of time or lower the price more than necessary.

As discussed earlier, since the probability distribution of the anticipated transaction price generated by the graph rendering unit 3319 is generated based on a distribution of the ratio of the actual transaction versus the appraisal value of real estate properties already bought or sold, the probability of reasonable transaction being established for the target real estate property may be expressed in the context of previous concrete examples.

In the illustrated graph, the distribution curve 1242 peaks at a price of 50,000,000 yen, and is most contained within a range of prices from 40,000,000 yen to 60,000,000 yen. This indicates that for the target real estate property, the range in which a reasonable transaction is likely to be established goes from approximately 40,000,000 yen to 60,000,000 yen, centered on 50,000,000 yen. In other words, according to the illustrated graph, based strictly on the history real estate properties already bought or sold, there is a low probability of a transaction being established within a normal period at a price exceeding 60,000,000 yen. Also, even if one wants to sell as quickly as possible, it is sufficient to lower the price down to 40,000,000 yen (and it is not necessary to lower the price any further).

Furthermore, in the illustrated graph, the statistical interval 1244 indicates that even among the above range from 40,000,000 yen to 60,000,000 yen, a more reasonable range is from 45,000,000 yen to 55,000,000 yen. Such an interval may be displayed as a statistical interval indicating the confidence of the probability distribution, such as the $1\sigma$ interval in a normal distribution, for example. Note that the $1\sigma$ interval in a normal distribution includes approximately 68.3% of the entire sample. However, the statistical interval 1244 is not necessarily limited to one that displays the $1\sigma$ interval of a normal distribution. For example, the statistical interval 1244 may also display another statistical interval, such as the $2\sigma$ interval of a normal distribution, or display a statistical interval defined in a probability distribution other than a normal distribution.

Note that, as discussed above, the graph rendering unit 3319 generates a probability distribution of the anticipated transaction price based on a distribution of the ratio of the actual transaction versus the appraisal value of real estate properties already bought or sold, but the probability distribution may also not necessarily directly reflect the distribution of the ratio of the actual transaction versus the appraisal value. For example, the probability distribution indicated by the distribution curve 1242 may also be fitted to a normal distribution (or to a probability distribution of another certain format). More specifically, the graph rendering unit 3319 converts the distribution of the actual transaction versus the appraisal value, or a distribution generated therefrom, into a distribution such as a normal distribution, based on statistical features of the distribution. For example, for real estate properties already bought or sold, if the average value of transaction price/appraisal value is 100%, and properties for which transaction price/appraisal value falls within 90% to 110% occupy approximately 68.3% of the whole, the probability distribution of the anticipated transaction price for a property with an appraisal value of 50,000,000 yen may be fitted to a normal distribution like the example illustrated in FIG. 6 (average value 50,000,000 yen, $1\sigma$ interval from 45,000,000 yen to 55,000,000 yen). In addition, although the distribution curve 1242 is used to express the probability distribution in the illustrated example, the probability distribution may also be expressed by another method, such as a histogram, for example. Additionally, the probability distribution does not necessarily have a symmetrical shape from left to right as illustrated in the drawing, and may also be expressed with a non-symmetrical shape from left to right, such as with a cumulative distribution, for example.

The anticipated required time labels 1243 are displayed as labels on the distribution curve 1242, and display the anticipated required transaction time for each anticipated transaction price. For example, in the illustrated example, the anticipated required time label 1243a displayed at the position on the distribution curve 1242 corresponding to an anticipated transaction price of 50,000,000 yen (the peak of the probability distribution) indicates that the anticipated required transaction time at a price of 50,000,000 yen is approximately three months. This time may be calculated as a value such as the mean, the median, or the mode of the required transaction times of properties bought or sold at a transaction price/appraisal value ratio of approximately 100% from among the real estate properties already bought or sold, for example. Similarly, the anticipated required time label 1243b displayed at the position on the distribution curve 1242 corresponding to an anticipated transaction price of 55,000,000 yen indicates that the anticipated required transaction time at a price of 55,000,000 yen is approximately six months.

Like in the illustrated example, the anticipated required time labels 1243 may be arranged at positions corresponding to summary statistical quantities of the probability distribution indicated by the distribution curve 1242. Summary statistical quantities include the mean, the median, or the mode of the price, for example. Additionally, the summary statistical quantities may also be the start point or the end point of a range defined based on the standard deviation ($\sigma$) of the anticipated transaction price. In the example illustrated in FIG. 6, the anticipated required time labels 1243 are disposed at the median of the anticipated transaction price (50,000,000 yen), as well the start point (45,000,000 yen) and the end point (55,000,000 yen) of the $1\sigma$ interval of the anticipated transaction price.

(Example of Assessment)

Figure 7:
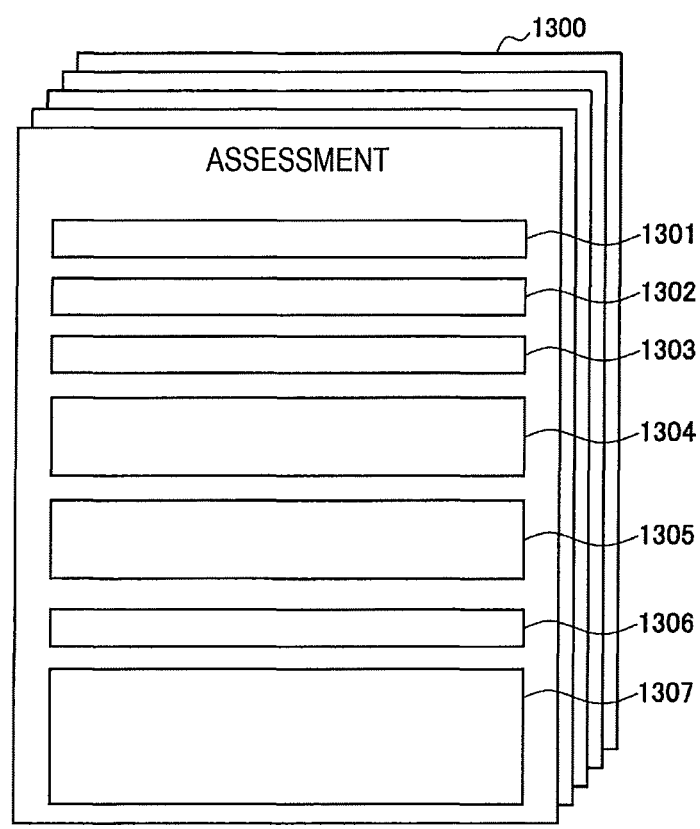
FIG. 7 is a diagram illustrating an example of an assessment provided in an embodiment of the present disclosure.

FIG. 7 is a diagram illustrating an example of an assessment provided in an embodiment of the present disclosure. FIG. 7 illustrates an example of an assessment 1300 which is displayed on the client 100, and which also is printed. The assessment 1300 includes a property overview 1301, bought/sold property information 1302, an appropriate price 1303, an appropriate price explanation 1304, comments 1305, a fee estimate 1306, and surrounding environment information 1307, for example. Note that in the client 100, a screen similar to the assessment 1300 may be displayed prior to printing the assessment 1300, for example.

The property overview 1301 is displayed based on information acquired by the property information acquisition unit 3311, for example. The property overview 1301 includes information about the target property that is typically displayed as an overview of a real estate property, and more specifically, includes information such as the location, the square measure, the age, traffic access, the floor plan, and the builder of the property. The bought/sold property information 1302 includes information about properties bought or sold in the past near the location of the target property. More specifically, the bought/sold property information 1302 may include information like that displayed as the bought/sold property list 1220 on the screen 1200 illustrated in FIG. 6.

The appropriate price 1303 indicates the appropriate price calculated by the appropriate price calculation unit 3313. As discussed earlier, in the present embodiment, the appropriate price calculation unit 3313 calculates an appropriate price based on a required time for the transaction specified by the user. Consequently, in the appropriate price 1303, the required time for the transaction that is anticipated may also be displayed together with the price. Alternatively, if the user has not specified a required time, the appropriate price 1303 may be calculated for an average required time, such as the required time displayed as the peak of the distribution curve 1242 on the screen 1200 illustrated in FIG. 6, for example. Likewise in this case, the automatically set required time may be displayed together with the appropriate price 1303.

The appropriate price explanation 1304 explains the basis for the calculation of the appropriate price 1303 using mathematical formulas, text, or the like. For example, as above, if the appraisal value calculation unit 3312 calculates an appraisal value of the property by using a function that includes appraisal factors of the real estate property as variables, and the appropriate price calculation unit 3313 calculates an appropriate price of the target property based on the relationship between the transaction price and the appraisal value of properties already bought or sold, then in the appropriate price explanation 1304, information such as the function used to calculate the appraisal value, the appraisal factors of the target property set as the variables of the function, a formula indicating the model used to calculate the appropriate price, and accompanying explanations of the above may be displayed.

The comments 1305 may be comments input manually by the agent, or comments generated automatically by the assessment creation unit 3318 from calculation results of the appropriate price and the price trend, for example. The comments 1305 include information such as what to do in order to sell the target property at a higher price (or buy a property satisfying the desired teams more cheaply), and whether it is more advantageous to sell the property or rent the property without selling (in this case, the processing unit 330 of the server 300 estimates the trend of rent for renting real estate properties according to a process similar to the transaction price), for example.

The fee estimate 1306 displays an estimate of agent fees incurred by the exchange of the target real estate. In the present embodiment, fees are calculated based on the rank of the agent and the characteristics of the real estate property. Typically, fees are calculated by multiplying the transaction price by a fixed ratio, for example, but in the present embodiment, fees are calculated dynamically based on factors such as the agent's performance or achievement, and the difficulty of establishing a transaction due to the characteristics of the property. Fees may be calculated by adding up monetary amounts corresponding factors like the above, irrespectively of the transaction price, or when calculating fees, the ratio by which to multiply the transaction price may vary according to factors like the above, for example. Furthermore, in another example, the fees may be calculated dynamically depending on the region where advertising was deployed, and the kind of advertising. Herein, advertising may include newspaper ads, transit ads, push messages, and web ads, for example. In this case, the agent or the service provider is able to save on advertising expenses and lower the fees by deploying advertising selectively to a region or users for which real estate property transactions are expected, based on information such as user attribute information and the trend of real estate properties in the region, for example.

The surrounding environment information 1307 displays surrounding environment information near the location of the target property. The surrounding environment information is acquired by the surrounding environment information acquisition unit 3316 as described earlier. For example, the surrounding environment information 1307 includes information about commercial facilities, means of transportation, educational establishments, nursing facilities, and the like near the property. As described earlier, information reflecting life events having a high probability of occurring for the user in the future, based on the life stage information acquired by the life stage information acquisition unit 3315, may also be displayed as the surrounding environment information 1307.

The above thus describes a user interface that may be provided in the present embodiment, specifically examples of a screen including a graph and an assessment. However, the items included on the screen and the assessment in the above description are an example, and the screen and the assessment may also include other additional items, or not include some of the described items. For example, items on the screen 1200 may also be displayed on the assessment 1300, and items on the assessment 1300 may also be displayed on the screen 1200. More specifically, information like the property overview 1301, the appropriate price 1303, the appropriate price explanation 1304, the comments 1305, the fee estimate 1306, and/or the surrounding environment information 1307 may also be displayed on the screen 1200. Also, information like the map window 1210, the price trend display 1230, and/or the graph window 1240 may also be displayed on the assessment 1300.

(3-3. Example of Appraisal Value Formula)

Figure 8:
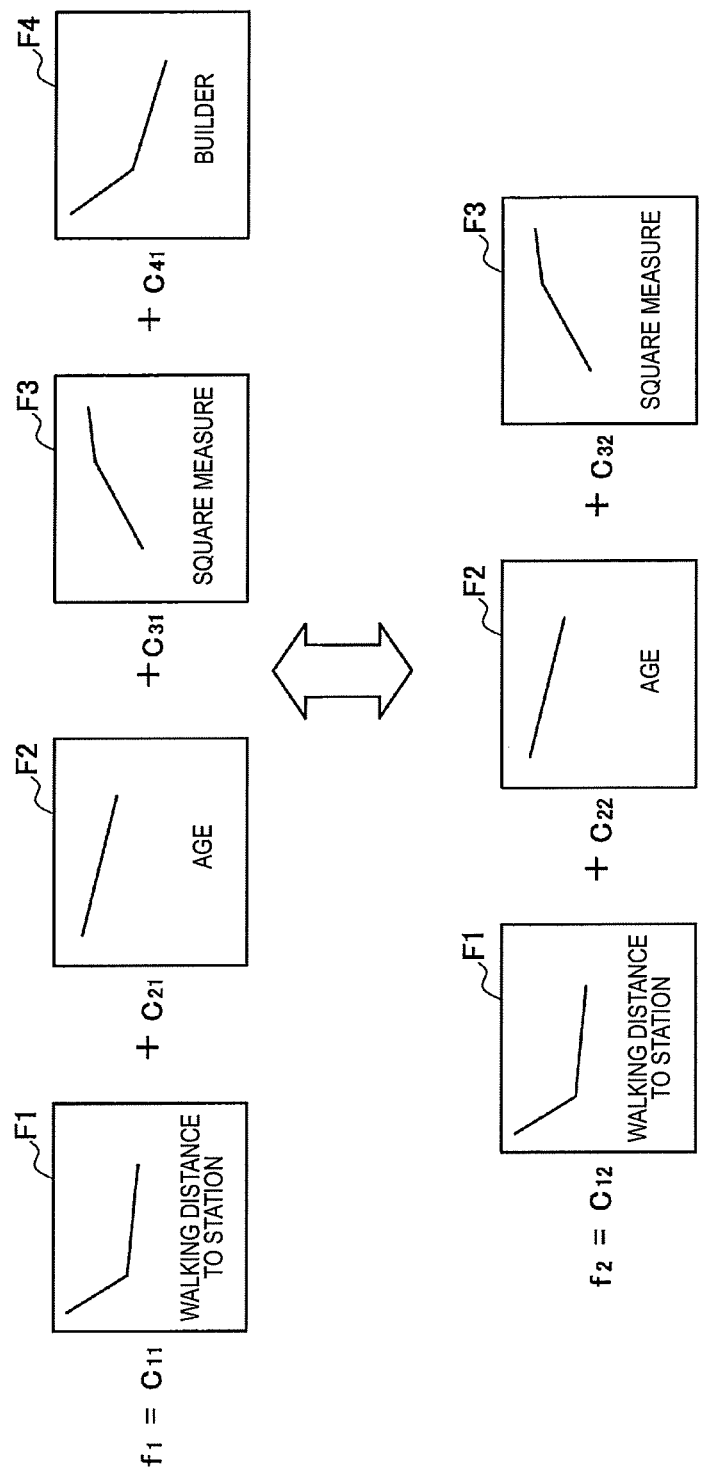
FIG. 8 is a diagram for explaining an example of an appraisal value formula according to an embodiment of the present disclosure.

FIG. 8 is a diagram for explaining an example of an appraisal value formula according to an embodiment of the present disclosure. As discussed earlier, the appraisal value calculation unit 3312 calculates an appraisal value of the real estate property by using a function that includes appraisal factors of the real estate property as variables, such as the location and square measure of the property, traffic access conditions, the shape of the land or building, the floor plan, the age of the building, and the builder. In the present embodiment, the function may be different depending on the location of the real estate property. In FIG. 8, this is illustrated by the example of appraisal factors F1 to F4.

In the illustrated example, the appraisal factor F1 (walking distance to station) indicates the traffic access conditions of the property, and more specifically, the required time to reach the nearest station. The appraisal factor F2 indicates the age of the property. The appraisal factor F3 indicates the square measure of the property. The appraisal factor F4 indicates the builder of the property. Among the above appraisal factors, the appraisal factors F1 to F3 may be treated as variables themselves. The appraisal becomes higher as the numerical values of the appraisal factors F1 and F2 become smaller, while the appraisal becomes higher as the numerical value of the appraisal factor F3 becomes larger. On the other hand, the appraisal factor F4 may be treated as a variable by assigning scores to classes of the appraisal factor.

In the example illustrated on the upper row of the drawing, a function $f_1$ for calculating the appraisal value includes the appraisal factors F1 to F4 as variables. Additionally, in the function $f_1$, a coefficient $C_{11}$ is assigned to the appraisal factor F1, a coefficient $C_{21}$ to the appraisal factor F2, a coefficient $C_{31}$ to the appraisal factor F3, and a coefficient $C_{41}$ to the appraisal factor F4. Meanwhile, in the example illustrated on the lower row of the drawing, a function $f_2$ for calculating the appraisal value includes the appraisal factors F1 to F3 as variables. Additionally, in the function $f_2$, a coefficient $C_{12}$ is assigned to the appraisal factor F1, a coefficient $C_{22}$ to the appraisal factor F2, and a coefficient $C_{32}$ to the appraisal factor F3.

In this way, in the present embodiment, in order for the appraisal value calculation unit 3312 to calculate the appraisal value, multiple functions f including different combinations of appraisal factors F may be used. The appraisal value calculation unit 3312 may also switch between the multiple different functions f depending on the location of the real estate property. In the present embodiment, the order or the coefficients of the appraisal factors F included in the function f may be different depending on the location of the real estate property. Also, the appraisal factors F themselves included in the function f may also be different depending on the location of the real estate property. Furthermore, in another example, the order or the variables of the appraisal factors F included in the function f, or the appraisal factors F themselves included in the function f, may also be different depending on a user profile. The user profile may include information such as gender, marital status, number and ages of children, and cohabitation status with elderly persons, for example.

Figure 9:
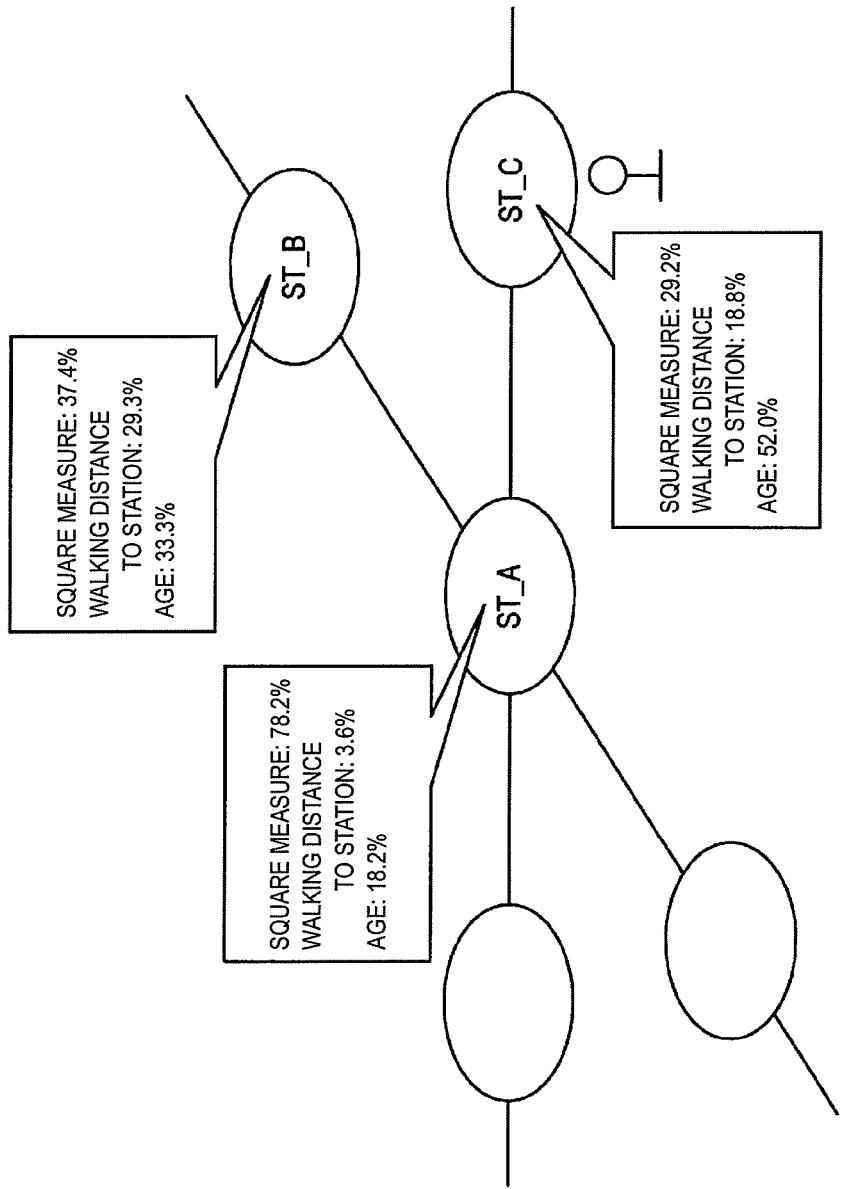
FIG. 9 is a diagram for explaining an example in which an appraisal value formula is different depending on location, according to an embodiment of the present disclosure.

FIG. 9 is a diagram for explaining an example in which an appraisal value formula is different depending on location, according to an embodiment of the present disclosure. Referring to FIG. 9, for real estate properties whose closest railway stations are the stations ST_A, ST_B, and ST_C, respectively, the coefficients of respective appraisal factors for "square measure", "walking distance to station", and "age" included in a function for calculating the appraisal value are illustrated. Note that in the illustrated example, the coefficients of these three appraisal factors are assigned so as to total 100%, but such coefficient assignment is merely one example, and there are no particular limitations on the total of the coefficients. In addition, as discussed earlier, the appraisal factors themselves included as variables may be different among functions applied to real estate properties in different locations. In the illustrated example, the real estate properties are categorized by the closest station, but in another example, real estate properties may be categorized by factors such as the administrative district and finer district subdivisions.

For example, in the function for calculating the appraisal value of the real estate property whose closest station is the station ST_A, the coefficient of the appraisal factor "square measure" is significantly higher (78.2%). Meanwhile, the coefficient of the appraisal factor "age" is low (18.2%) compared to the properties by the other stations discussed later. This reflects that the neighborhood near the station ST_A is itself popular, has many properties that are charming even if old, and there is a tendency of people not being bothered by the age of the buildings. Furthermore, in the function for calculating the appraisal value of the real estate property whose closest station is the station ST_A, the coefficient of the appraisal factor "walking distance to station" is significantly lower (3.6%). This reflects that the neighborhood itself is popular as above, the station ST_A is a transfer station between two railway lines, and since the neighboring stations are also close by, there are many properties with little difference in the time to walk to the nearest station. Note that in cases where one coefficient of an appraisal factor is significantly lower compared to the others in this way, that appraisal factor may also be excluded from the variables.

On one hand, in the function for calculating the appraisal value of the real estate property whose closest station is the station ST_B, nearly equal coefficients (around 30%) are assigned to the respective appraisal factors for "square measure", "walking distance to station", and "age". This reflects that since the neighborhood near the station ST_B is not particularly popular itself, and also not equipped with bus services like the station ST_C discussed later, there is a tendency for people to place equal emphasis on each of the square measure, the walking distance to the station, and the age of the buildings.

On the other hand, in the function for calculating the appraisal value of the real estate property whose closest station is the station ST_C, the coefficient of the appraisal factor "walking distance to station" is lower (18.8%) compared to the station ST_B, whereas the coefficient of the appraisal factor "age" is higher (52.0%). This reflects that the station ST_C is equipped with bus services from the station, so the price does not fall as much for properties a long way from the station on foot, and also that since bus services may be utilized, there is a wide range of properties accessible from the station, and newer properties with lower ages are being selected from among the many properties.

As above, as a result of the different coefficients of the appraisal factors in the functions for calculating the appraisal value at respective stations, the appraisal value becomes different depending on which station is the closest station, even among real estate properties having the same appraisal factors, for example. For example, consider a property with a square measure score of 30, a walking distance to station score of 20, and an age score of 90. For this property, the score obtained as the value of the function (the total of each appraisal factor score multiplied by its coefficient) is 40.56 if the closest station is the station ST_A, 47.05 if the closest station is the station ST_B, and 59.32 if the closest station is the station ST_C.

The appraisal factors to include in the function for each station (or in another example, each administrative district or the like) and the coefficients to assign to the appraisal factors included in the function may be specified by performing machine learning on real estate properties already bought or sold in each region, using the relationship between the appraisal factors and the transaction price as samples, for example. At this point, to eliminate the effects of other factors (for example, the required time), a calculation of a virtual appraisal value assuming an average required time (setting the appraisal value to a value obtained by correcting the actual transaction price upward if the required time is short, and setting the appraisal value to a value obtained by correcting downward if the required is long) may be performed. In addition, the above learning of the function may also be performed in parallel with the generation of a model indicating the relationship between the appraisal value and the appropriate price for each of anticipated required transaction times by the appropriate price calculation unit 3313 as discussed earlier. In this case, the function may be corrected based on the model generation result. For example, if there is large error when modeling the relationship between the actual transaction and the appraisal value based on the required transaction time, the possibility that the appraisal value is not reasonable may be investigated. By correcting the function based on the result of the model generation, and using the appraisal value calculated by the corrected function to further generate a model, the accuracy of the function and the model may be improved further.

(4. Package Simulation of Related Services)

(4-1. Functional Configuration)

In the system 10 according to the present embodiment, a package simulation of related services in the buying or selling of real estate may be provided by having the server 300 query an external server. In the following, a detailed configuration of the server 300 for realizing such a function will be described further.

Figure 10:
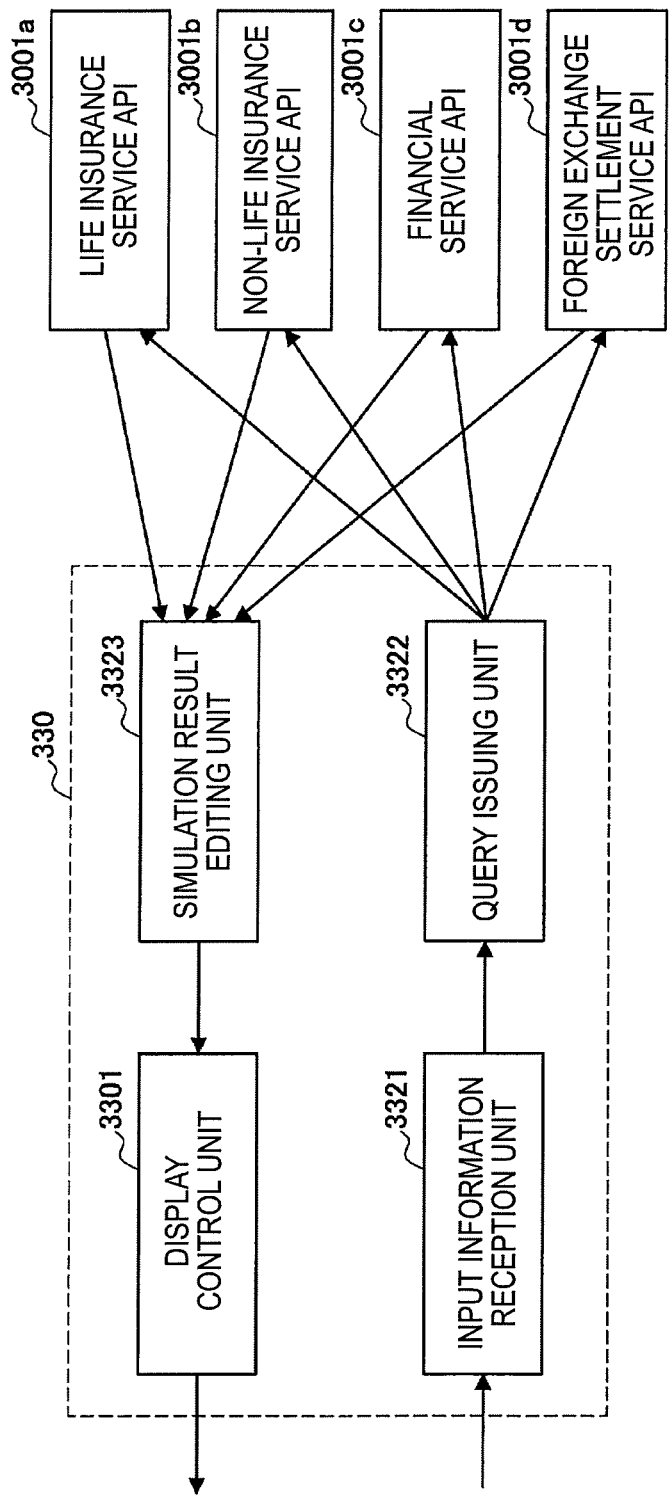
FIG. 10 is a block diagram illustrating an example functional configuration for providing package simulation of related services in an embodiment of the present disclosure.

FIG. 10 is a block diagram illustrating an example functional configuration for providing package simulation of related services in an embodiment of the present disclosure. Referring to FIG. 10, in this example, the processing unit 330 of the server 300 includes an input information reception unit 3321, a query issuing unit 3322, a simulation result editing unit 3323, and the display control unit 3301.

The input information reception unit 3321 receives input information acquired by the input/output unit 140 of the client 100, through the network 200 and the communication unit 320. Input information is acquired by a touch panel, a mouse, a keyboard, or the like included in the input/output unit 140, for example. The input information reception unit 3321 provides the received information to the query issuing unit 3322. More specifically, for example, the input information may include personal information, such as the age, income, and funds of the user of the client 100, as well as service-specific information, such as a loan amount, a repayment period, and an insurance amount.

The query issuing unit 3322 issues query commands to the APIs 3001 of respective services provided by the external server, based on the information received by the input information reception unit 3321. In the illustrated example, query commands are issued to a life insurance service API 3001a, a non-life insurance service API 3001b, a financial service API 3001c, and a foreign exchange settlement service API 3001d. The types of query commands issued by the query issuing unit 3322 may also be specified by the input information. Note that the APIs 3001 of the various services above may be provided by an external server different from the server 300, or may be provided by the server 300 internally (in this case, the APIs 3001 may also be executed by the processing unit 330). The service APIs 3001 in the illustrated example are one example, and service APIs 3001 may be provided for various other types of services. Additionally, the service APIs 3001 may also be provided by multiple service providers for the same type of service, such as financial, life insurance, or non-life insurance, for example.

The simulation result editing unit 3323 receives simulation results transmitted by the APIs 3001 of the respective services provided by the external server in response to the query commands, and edits the received results for output to the user on the client 100. As above, in the illustrated example, query commands are issued to a life insurance service API 3001a, a non-life insurance service API 3001b, a financial service API 3001c, and a foreign exchange settlement service API 3001d, and simulation results are transmitted from each of these APIs 3001. The simulation result editing unit 3323 may also edit the respective simulation results for display on the same screen, for example. By such processing of the simulation result editing unit 3323, it is possible to reference the simulation results of services, such as a life insurance service, a non-life insurance service, a financial service, and a foreign exchange settlement service provided by different service providers, for example, as a single package on the client 100.

As already described, the display control unit 3301 controls a display device such as a display included in the input/output unit 140 of the client 100, through the communication unit 320 and the network 200. More specifically, in the illustrated example, the display control unit 3301 generates data for displaying an image on the client 100 (such as HTML or other document data, or encoded image data, for example), based on data provided by the simulation result editing unit 3323, and transmits the generated data to the client 100 through the communication unit 320. In the client 100, the processing unit 130 receiving data through the communication unit 120 generates a control signal for causing a display or the like to display the above image.

(4-2. Example of User Interface)
(Example of Input Screen)

Figure 11:
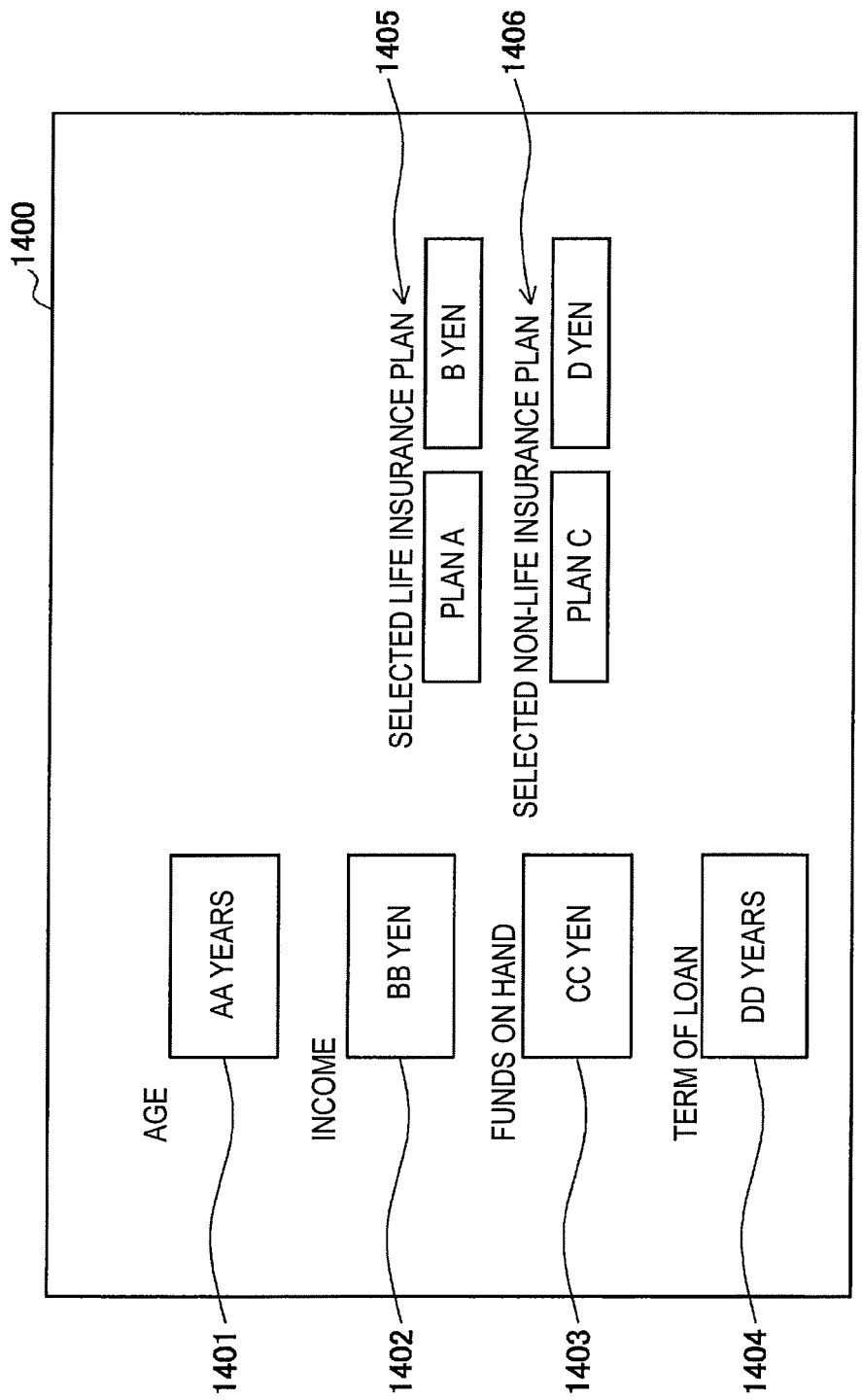
FIG. 11 is a diagram illustrating an example of an input screen for package simulation of related services, provided in an embodiment of the present disclosure.

FIG. 11 is a diagram illustrating an example of an input screen for package simulation of related services, provided in an embodiment of the present disclosure. Referring to FIG. 11, a screen 1400 displayed on the client 100 includes an age input unit 1401, an income input unit 1402, a funds input unit 1403, a repayment period input unit 1404, a life insurance-related information input unit 1405, and a non-life insurance-related information input unit 1406.

The age input unit 1401 to the non-life insurance-related information input unit 1406 are display elements for acquiring input information for simulation. With these display elements, personal information, such as the age, income, and funds of the user of the client 100, as well as service-specific information, such as a loan amount, a repayment period, and an insurance amount, are input. However, the illustrated input units are one example, and the input units to display may be different depending on factors such as the types of services provided by the simulation, for example. Additionally, the screen 1400 may also include display elements such as check boxes enabling the user to select desired services from among the simulation of various services such as life insurance, non-life insurance, financing, and foreign exchange settlement.

(Example of Results Display Screen)

FIG. 12 is a diagram illustrating an example of a results display screen for package simulation of related services, provided in an embodiment of the present disclosure. Referring to FIG. 12, a screen 1500 displayed on the client 100 includes simulation results 1501 of financial services, simulation results 1502 of life insurance services, and simulation results 1503 of non-life insurance services. In this way, in the present embodiment, on the screen displayed on the client 100, it is possible to reference the simulation results of multiple types of services as a single package. However, the illustrated simulation results are one example, and simulation results of other types of services, such as the simulation results of a foreign exchange settlement service illustrated in the example above, for example, may also be displayed.

By package simulation of related services in the buying or selling of real estate as described above, the user is able to reference the simulation results of multiple services, without having to input personal information every time the simulation of each service is used. Additionally, since multiple simulation results may be referenced as a single package, it becomes easy to perform a combined evaluation of the simulation results for different types of services, such as financing and insurance, or compare the same type of service between different service providers.

In addition, in another example, information related to real estate properties described in another section of this specification may also be presented similarly to the above package simulation. In this case, for example, information provided by multiple real estate agents is integrated, and if the user inputs required information on a single input screen, the appropriate price or other estimate information presented by multiple real estate agents may be presented. Consequently, it may be easy to find a real estate agent that makes a good match with each user. Herein, real estate agents may belong to the same service provider (a company, for example), or may belong to different service providers. If agents belong to different service providers, the package simulation of estimates related to real estate properties enables the same type of service to be compared between different service providers, similarly to financing, insurance, or the like. Furthermore, such package simulation of estimates related to real estate properties may be integrated with the package simulation of financing, insurance, and the like discussed above, making it possible to calculate and present to the user the total costs, in which financing and insurance interest, premiums, fees, and the like are added to the monetary amount involved in the transaction of the real estate property itself.

(5. Hardware Configuration)

Next, with reference to FIG. 13, a hardware configuration of an information processing device according to an embodiment of the present disclosure is described. FIG. 13 is a block diagram illustrating a hardware configuration example of the information processing device according to the embodiment of the present disclosure. An illustrated information processing device 900 may achieve the server or the client in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933 and a sensor 935, as necessary. The information processing device 900 may include a processing circuit such as a digital signal processor (DSP), an application-specific integrated circuit (ASIC), or a field-programmable gate array (FPGA), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 is realized by a device capable of notifying the user of acquired information using senses such as vision, hearing, and touch. The output device 917 may be a display device such as a liquid crystal display (LCD) or an organic electro-luminescence (EL) display, an audio output device such as one or more speakers or headphones, or a device such as a vibrator. The output device 917 outputs results obtained from processing by the information processing device 900 in the form of visual information such as text or an image, in the form of audio such as speech or sound, or in the form of vibration or the like.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing device 900. The connection port 923 may be a Universal Serial Bus (USB) port, an IEEE1394 port, or a Small Computer System Interface (SCSI) port, for example. The connection port 923 may also be an RS-232C port, an optical audio terminal, a High-Definition Multimedia Interface (HDMI (registered trademark)) port, and so on. The connection of the external connection device 929 to the connection port 923 makes it possible to exchange various kinds of data between the information processing device 900 and the external connection device 929.

The communication device 925 is a communication interface including, for example, a communication device for connection to a communication network 931. The communication device 925 may be a communication card for, for example, a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The imaging device 933 is a device that shoots a real space by using an image sensor such as a complementary metal oxide semiconductor (CMOS) and a charge coupled device (CCD), and various members such as a lens for controlling image formation of a subject image onto the image sensor, and generates the shot image. The imaging device 933 may shoot a still image or a moving image.

The sensor 935 is any of various sensors, such as an acceleration sensor, an angular velocity sensor, a geomagnetic sensor, an illuminance sensor, a temperature sensor, a barometric pressure sensor, or a sound sensor (microphone), for example. The sensor 935 acquires information regarding a state of the information processing device 900 itself such as a posture of a housing of the information processing device 900, and information regarding an environment surrounding the information processing device 900 such as luminous intensity and noise around the information processing device 900. The sensor 935 may include a global positioning system (GPS) receiver that receives GPS signals to measure latitude, longitude, and altitude of the device.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiments of the present disclosure may include, for example, the above-described information processing apparatus (a server or a client), system, an information processing method executed by the information processing apparatus or the system, a program for causing the information processing device to exhibit its function, and a non-transitory tangible medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device, including:

a graph rendering unit that renders a graph expressing an anticipated transaction price of a second real estate property, based on actual transaction prices and required transaction times of a first real estate property already bought or sold; and a display control unit that causes the graph to be displayed on a client device, wherein the graph includes an element expressing a probability distribution of the anticipated transaction price, and an element expressing an anticipated required transaction time corresponding to the anticipated transaction price.

(2)

The information processing device according to (1), wherein the element expressing the probability distribution includes a histogram or a distribution curve.

(3)

The information processing device according to (2), wherein the element expressing the anticipated required transaction time includes a label on the histogram or the distribution curve.

(4)

The information processing device according to (3), wherein the label is disposed at a position corresponding to a summary statistical quantity of the probability distribution.

(5)

The information processing device according to (4), wherein the label is disposed at a position corresponding to a mean value, a median value, or a mode value of the probability distribution.

(6)

The information processing device according to (4) or (5), wherein the label is disposed at a start point or an end point of a range defined based on a standard deviation of the probability distribution.

(7)

The information processing device according to any one of (1) to (6), further including:

an appraisal value calculation unit that calculates an appraisal value of the first real estate property and the second real estate property, wherein the graph rendering unit generates the probability distribution by applying a distribution of ratios of actual transaction prices versus appraisal values of the first real estate property to the appraisal value of the second real estate property.

(8)

The information processing device according to (7), wherein the graph rendering unit fits the distribution of ratios or the probability distribution based on statistical features.

(9)

The information processing device according to (8), wherein the graph rendering unit fits the distribution of ratios or the probability distribution to a normal distribution.

(10)

The information processing device according to any one of (7) to (9), wherein the appraisal value calculation unit calculates the appraisal value by using a function that includes appraisal factors for each of the first real estate property and the second real estate property as variables.

(11)

The information processing device according to (10), wherein the appraisal value calculation unit calculates the appraisal value by using the function that is different depending on a location of the first real estate property and the second real estate property (12)

The information processing device according to (11), wherein the appraisal factors included in the function, or an order or a coefficient of the appraisal factors, is different depending on the location.

(13)

The information processing device according to any one of (1) to (12), further including:

a surrounding environment information acquisition unit that acquires surrounding environment information near a location of the second real estate property, wherein the display control unit causes the graph together with the surrounding environment information to be displayed on the client device.

(14)

The information processing device according to (13), further including:

a life stage information acquisition unit that acquires life stage information about a user of the client device, wherein the surrounding environment information acquisition unit acquires the surrounding environment information based on the life stage information.

(15)

The information processing device according to (14), wherein the surrounding environment information acquisition unit acquires the surrounding environment that reflects life events having a high probability of occurring for the user in the future, based on the life stage information.

(16)

The information processing device according to any one of (1) to (15), further including:

a life stage information acquisition unit that acquires life stage information about a user of the client device, wherein the graph rendering unit renders the graph that expresses an anticipated transaction price of the second real estate property at a future point in time specified based on the life stage information.

(17)

An information processing method, including:

rendering, by a processor, a graph expressing an anticipated transaction price of a second real estate property, based on actual transaction prices and required transaction times of a first real estate property already bought or sold; and causing, by a processor, the graph to be displayed on a client device, wherein the graph includes an element expressing a probability distribution of the anticipated transaction price, and an element expressing an anticipated required transaction time corresponding to the anticipated transaction price.

(18)

A program causing a computer to realize:

a function of rendering a graph expressing an anticipated transaction price of a second real estate property, based on actual transaction prices and required transaction times of a first real estate property already bought or sold; and a function of causing the graph to be displayed on a client device, wherein the graph includes an element expressing a probability distribution of the anticipated transaction price, and an element expressing an anticipated required transaction time corresponding to the anticipated transaction price.

REFERENCE SIGNS LIST 10 system
100 client
110 local storage
120 communication unit
130 processing unit
140 input/output unit
200 network
300 server
310 database
320 communication unit
330 processing unit
340 input/output unit

The invention claimed is:

1. An information processing device, comprising:
a processor configured to:
render a graph expressing a relationship between time and an anticipated transaction price of a second real estate property, based on past transaction prices and respective past appraisal values and respective past recorded transaction times of a respective plurality of first real estate properties which were already sold;
cause the graph to be displayed on a client device, wherein the graph includes an element expressing a probability distribution of the anticipated transaction price;
relative to an anticipated required transaction time corresponding to the anticipated transaction price;
calculate the respective past appraisal values of the plurality of first real estate properties and the second real estate property;
generate the probability distribution by applying a distribution of ratios of the respective past transaction prices versus the respective past appraisal values of the first real estate property, to an appraisal value of the second real estate property;
generate appraisal values by using a function comprising appraisal factors;
select the appraisal factors from a plurality of possible sets of appraisal factors dependent upon a location selection associated with the first real estate properties;
modify the function based on the location selection and the selected appraisal factors; and
generate new appraisal factors by using the modified function.

2. The information processing device according to claim 1, wherein
the element expressing the probability distribution includes a histogram or a distribution curve.

3. The information processing device according to claim 2, wherein
the element expressing the anticipated required transaction time includes a label on the histogram or the distribution curve.

4. The information processing device according to claim 3, wherein
the label is disposed at a position corresponding to a summary statistical quantity of the probability distribution.

5. The information processing device according to claim 4, wherein
the label is disposed at a position corresponding to a mean value, a median value, or a mode value of the probability distribution.

6. The information processing device according to claim 4, wherein
the label is disposed at a start point or an end point of a range defined based on a standard deviation of the probability distribution.

7. The information processing device according to claim 1, wherein the circuitry is further configured to fit the distribution of ratios or the probability distribution based on statistical features.

8. The information processing device according to claim 7, wherein the circuitry is further configured to fit the distribution of ratios or the probability distribution to a normal distribution.

9. The information processing device according to claim 1, wherein
the function treats the appraisal factors as variables depending on any one or more of: square measure of the property, age of the building of the property, traffic access conditions of the property, location of property, shape of the land or building of the property, floor plan of the property, or a builder of the property.

10. The information processing device according to claim 9, wherein an order or a coefficient of the appraisal factors is dependent upon the location.

11. The information processing device according to claim 1, wherein the circuitry is further configured to:
acquire surrounding environment information near a location of the second real estate property; and
cause the graph together with the surrounding environment information to be displayed on the client device.

12. The information processing device according to claim 11, wherein the circuitry is further configured to:
acquire life stage information about a user of the client device, and
acquire the surrounding environment information based on the life stage information.

13. The information processing device according to claim 12, wherein the circuitry is further configured to acquire the surrounding environment that reflects life events having a high probability of occurring for the user in the future, based on the life stage information.

14. The information processing device according to claim 1, wherein the circuitry is further configured to:
acquire life stage information about a user of the client device, and
render the graph that expresses an anticipated transaction price of the second real estate property at a future point in time specified based on the life stage information.

15. An information processing method, comprising:
rendering, by a processor, a graph expressing a relationship between time and an anticipated transaction price of a second real estate property, based on past transaction prices and respective past appraisal values and respective past recorded transaction times of a first real estate properties which were already sold;
causing, by a processor, the graph to be displayed on a client device, wherein the graph includes an element expressing a probability distribution of the anticipated transaction price relative to an anticipated required transaction time corresponding to the anticipated transaction price;
calculating the respective past appraisal values of the plurality of first real estate properties and the second real estate property;
the rendering of the graph by generating the probability distribution by applying a distribution of ratios of the respective past transaction prices versus the respective past appraisal values of the first real estate property, to the appraisal value of the second real estate property;
generating appraisal values by using a function comprising appraisal factors;
selecting the appraisal factors from a plurality of possible sets of appraisal factors dependent upon a location selection associated with the first real estate properties;
modifying the function based on the location selection and the selected appraisal factors; and
generating new appraisal factors by using the modified function.

16. A non-transitory computer-readable medium storing instructions that, when executed by a processor, cause the processor to perform a method comprising:
rendering a graph expressing a relationship between time and an anticipated transaction price of a second real estate property, based on past transaction prices and respective past appraisal values and respective past recorded transaction times of a first real estate properties which were already sold;
causing the graph to be displayed on a client device, wherein the graph includes an element expressing a probability distribution of the anticipated transaction price relative to an anticipated required transaction time corresponding to the anticipated transaction price;
calculating the respective past appraisal values of the plurality of first real estate properties and the second real estate property;
the rendering of the graph by generating the probability distribution by applying a distribution of ratios of the respective past transaction prices versus the respective past appraisal values of the first real estate property, to the appraisal value of the second real estate property;
generating appraisal values by using a function comprising appraisal factors;
selecting the appraisal factors from a plurality of possible sets of appraisal factors dependent upon a location selection associated with the first real estate properties;
modifying the function based on the location selection and the selected appraisal factors; and
generating new appraisal factors by using the modified function.

17. The information processing device according to claim 1, wherein each of the appraisal factors is associated with a respective one of a plurality of coefficients, and the plurality of coefficients are used in the function.

18. The information processing device according to claim 17, wherein the plurality of coefficients are assigned so as to total 100%.

19. The information processing device according to claim 1, wherein the appraisal factors comprise two or more of: a square measure of the second real estate property, a walking distance to a station, an age of the second real estate property, traffic access conditions, a floor plan of the second real estate property, and a builder of the second real estate property.

* * * * *